United States Patent [19]

Jones

[11] Patent Number: 5,426,571
[45] Date of Patent: Jun. 20, 1995

[54] MOTORCYCLE HEADLIGHT AIMING DEVICE

[76] Inventor: Jerry Jones, 202 Albion Ct., Novato, Calif. 94947

[21] Appl. No.: 29,767

[22] Filed: Mar. 11, 1993

[51] Int. Cl.⁶ .................................................. B62J 6/00
[52] U.S. Cl. ........................................ 362/72; 362/66; 362/286
[58] Field of Search ............... 362/66, 72, 71, 285, 362/286, 287, 284

[56] References Cited

U.S. PATENT DOCUMENTS

| | | | |
|---|---|---|---|
| 3,939,339 | 2/1976 | Alphen | 240/62.2 |
| 4,024,388 | 5/1977 | Skoff | 240/7.55 |
| 4,075,469 | 2/1978 | Alphen | 362/72 |
| 4,868,720 | 9/1989 | Miyauchi et al. | 362/72 X |
| 4,870,545 | 9/1989 | Hatanaka et al. | 362/72 |
| 4,922,390 | 5/1990 | Nakazawa et al. | 362/72 |
| 5,217,087 | 6/1993 | Ikegami et al. | 362/72 X |

FOREIGN PATENT DOCUMENTS 62-96148  5/1987  Japan .

Primary Examiner—Stephen F. Husar

[57] ABSTRACT

A device which determines the direction and amount of tilt, lean, bank, or attitude of a vehicle relative to the road surface by means of one or more sensors which measure the return time of emitted energy reflected from the road surface. Vehicle attitude information is used to move, correct, adjust, or otherwise alter preselected vehicle parts or functions according to a predetermined combination of computer paradigms and mechanical linkages. This process can be used to adjust the headlight beam orientation in order to better illuminate the forward path of the vehicle. The headlight beam may be further adjusted according to information on vehicle speed and changes thereof. The Motorcycle Headlight Aiming Device may be used to aim a camera which is mounted to a banking vehicle. Bank angle data may also be used to switch off a turn signal mechanism, and to limit engine power at extreme angles of bank. Engine power may also be limited when sensor data indicates front wheel lift-off.

7 Claims, 25 Drawing Sheets

MOTORCYCLE HEADLIGHT AIMING DEVICE

BACKGROUND—FIELD OF INVENTION

A method of determining the degree of tilt, bank, lean, or attitude of a vehicle relative to the road surface, which makes possible various improvements in vehicle performance, the most significant of which is improved headlight illumination for motorcycles.

BACKGROUND—FIELD OF PRIOR ART

When a motorcycle leans or banks into a turn, the headlight beam fails to adequately illuminate the road ahead for four reasons:

1) HEADLAMP HEIGHT ERROR—banking a motorcycle physically lowers the headlight. Because the headlight beam is set to tilt downward toward the road, lowering the headlight shortens the range of illumination.
2) STEERING ANGLE ERROR—motorcycle headlights are often rigidly mounted on a fairing, but even when the headlight turns with the front wheel, the steering angle, or the angle between the planes of the two wheels, is not sufficient to turn the headlight enough to illuminate the roadway in the direction of the turn. Instead, the center of the beam is tangent to the curve. As the motorcycle banks, the steering angle points the beam increasingly downward, further shortening the range of forward illumination.
3) BEAM TILT ANGLE ERROR—when the angle of the headlight beam is properly adjusted with the vehicle in an upright position by pivoting the headlight about a horizontal axis at a right angle to the direction of travel, the center of the beam is tilted or angled slightly downward, with the top cutoff of the high beam aimed toward the horizon in order to illuminate the road surface ahead. But as the motorcycle is banked, this downward beam angle rotates about an axis defined by the contact points of the two tires, so that the center of the beam is aimed toward the outside of the turn, shortening the forward range of illumination in the direction of the turn.
4) BEAM PATTERN ERROR—the headlight beam pattern is a cross section of the headlight beam, generally in the shape of a horizontal rectangle with a sharply cut upper edge to minimize the light which could shine into the eyes of oncoming drivers. As a motorcycle turns, the beam pattern tilts with the banking motorcycle and is thus cut off too low on the inside of the turn and too high on the outside. This tilted beam pattern not only fails to illuminate the path of the turning motorcycle, it also blinds oncoming drivers in the outside lane.

Various means of correcting these errors have been proposed, although none are in common use today.

U.S. Pat. No. 4,204,388 (Skoff, May 17, 1977) shows a main headlight with fixed supplimentary headlights pointed to either side to illuminate right and left turns, these supplimentary lights being also mounted at a fixed angle of rotation about their beam axes so as to roughly correct for beam pattern error. The lights are controlled by a pendulum switch comprising a quantity of mercury in a U-shaped tube transversely mounted on the motorcycle. This method of determining the direction and angle of bank depends on the rider moving from side to side in a turn. Although this is done in racing, where the rider's padded knee is often extended to contact the road surface at the inside of the turn for added stability, in normal riding the rider's center of gravity remains aligned with the plane of the motorcycle, thus there would be no effect on the pendulum switch. Moreover, Skoff's drawings show the mercury level displaced in a direction opposite to that which would occur if the rider were leaning inward.

U.S. Pat. No. 3,939,339 (Alphen, May 17, 1976) describes a means of correcting for beam pattern error only, using a cam system to detect the direction of handlebar rotation and a sprung weight to indicate the degree of bank by measuring the amount by which the centrifugal force of a banked turn moves the weight toward the tire contact point. This movement causes the headlight to rotate about the beam axis in a direction determined by handlebar rotation. Clearly, this mechanism is extremely susceptible to the influence of bumps and to rises and falls in the road surface. Moreover, centrifugal force at low speeds would be insufficient to rotate the light, and handlebar movement would be insufficient to activate the cam-operated gear change illustrated at high vehicle speeds.

The Japanese Laid Open Patent Number Sho. 62-96148 (Kitamura et al., 1987) derives a headlight pivot angle from the degree of bank and speed of the motorcycle, and rotates the headlamp along the optical, or beam axis by an amount equal and opposite to the bank angle in order to keep the rectangular beam pattern horizontal. This design, as in aircraft instrumentation, uses a gyroscope to measure the bank angle. However, headlight beam rotation based on a true horizontal orientation will not work well on banked turns, introducing a tilt angle error in the opposite direction to that of a conventional motorcycle headlight, thus blinding oncoming drivers in the inside lane.

Moreover, Kitamura shows a device where the headlight pivot axis banks with the motorcycle, increasing the steering angle error, which tends to aim the beam further downward as the motorcycle banks. In addition to the gyro motor, two servomotors are required to move the headlight, one controlling the rotation about the beam axis, the other controlling the movement about the pivot axis.

U.S. Pat. No. 4,870,545 (Hatanaka, et al., Sep. 26, 1989) expands on the Japanese patent cited above by determining whether the vehicle is entering a turn, in which case the headlight is pivoted further to the inside to illuminate the apex of the turn, or whether the vehicle is exiting a turn, in which case the beam pivot angle is reduced to better illuminate the straightaway following the turn. This determination is the product of a complex microprocessor program combining data on vehicle speed, throttle position, gear position and steering angle from a variety of sensors. Although the adjustment of headlight aim based on the position of the motorcycle in the turn may be useful, the means described are unnecessarily complicated.

In order to avoid the cost and complexity of a gyroscopic bank detector, Hatanaka uses a steering angle measuring device, calculating the angle of bank from information on steering angle and vehicle speed. Note that both Alphen and Hatanaka use some means to detect or measure the steering angle in order to determine the direction or degree of bank. Although the angle of bank can be accurately derived from the steering angle and speed in a sustained curve, this method gives momentary false results whenever a turn is begun, because in initiating a turn it is necessary first to turn the front wheel in a direction opposite to the direction of the turn in order to move the tire contact points to one side of the vehicle's center of gravity, causing the vehicle to tilt or bank about a longitudinal axis which intersects the center of gravity. In fact, when negotiating a series of S curves in which the motorcycle is continually banking from one side to the other, any measurement of bank angle based on steering angle will be wrong almost half the time, rendering any lighting compensation thus derived dangerously inaccurate.

OBJECTS AND ADVANTAGES

The Motorcycle Headlight Aiming Device is unique in that the angle and direction of bank are determined by one or more electronic distance sensors measuring the distance to the road surface on one or both sides of the vehicle. The output from the sensor(s) is fed into a microprocessor circuit which computes the direction and angle of bank relative to the road surface; thus the headlight beam can be rotated about a longitudinal, or beam, axis so as to ensure that the rectangular beam pattern remains parallel to the road surface at all times, regardless of the degree to which the road is banked.

In addition, in the Motorcycle Headlight Aiming Device the headlight pivot axis rotates with the headlight assembly. Because the pivot axis therefore remains perpendicular or normal to the road surface at any angle of bank, the swept angle of the beam remains parallel to the road surface as the headlight assembly pivots as necessary to illuminate the curve ahead.

The bank sensor data may be used to control a bank warning signal, an engine power limiter to reduce the risk of skidding at extreme angles of bank as well as preventing front wheel liftoff under extreme acceleration, and an automatic turn signal control which shuts off the turn signal whenever the motorcycle returns to an upright position.

The bank sensor data may also be used in combination with vehicle speed data inputed to a microprocessor circuit which controls the headlight aim more precisely, allowing the use of a more narrowly focused beam, giving a brighter beam at any given wattage. Hatanaka's goal of an additional beam pivot adjustment for entering and exiting a turn is realized in several embodiments of the Motorcycle Headlight Aiming Device using a variety of simple inertial and pneumatic means.

A further advantage of the Motorcycle Headlight Aiming Device is that, in many embodiments, rotation along the beam axis mechanically pivots the beam at a predetermined angle about the pivot axis. Thus the headlight movement is powered by only one motor.

Although some embodiments have a second motor which compensates for variation in vehicle speed and/or acceleration-deceleration, this second motor would require far less power and would therefore be more compact and less expensive. In other embodiments the function of the second motor is effected pneumatically, or by a simple electric coil. A further embodiment uses a selectively switched array of fixed headlamps, wherein the switch is controlled by the unique bank angle measuring means described above.

Further objects and advantages of my invention will become apparent from a consideration of the drawings and ensuing description.

LIST OF REFERENCE LETTERS AND NUMERALS

Figure 1:
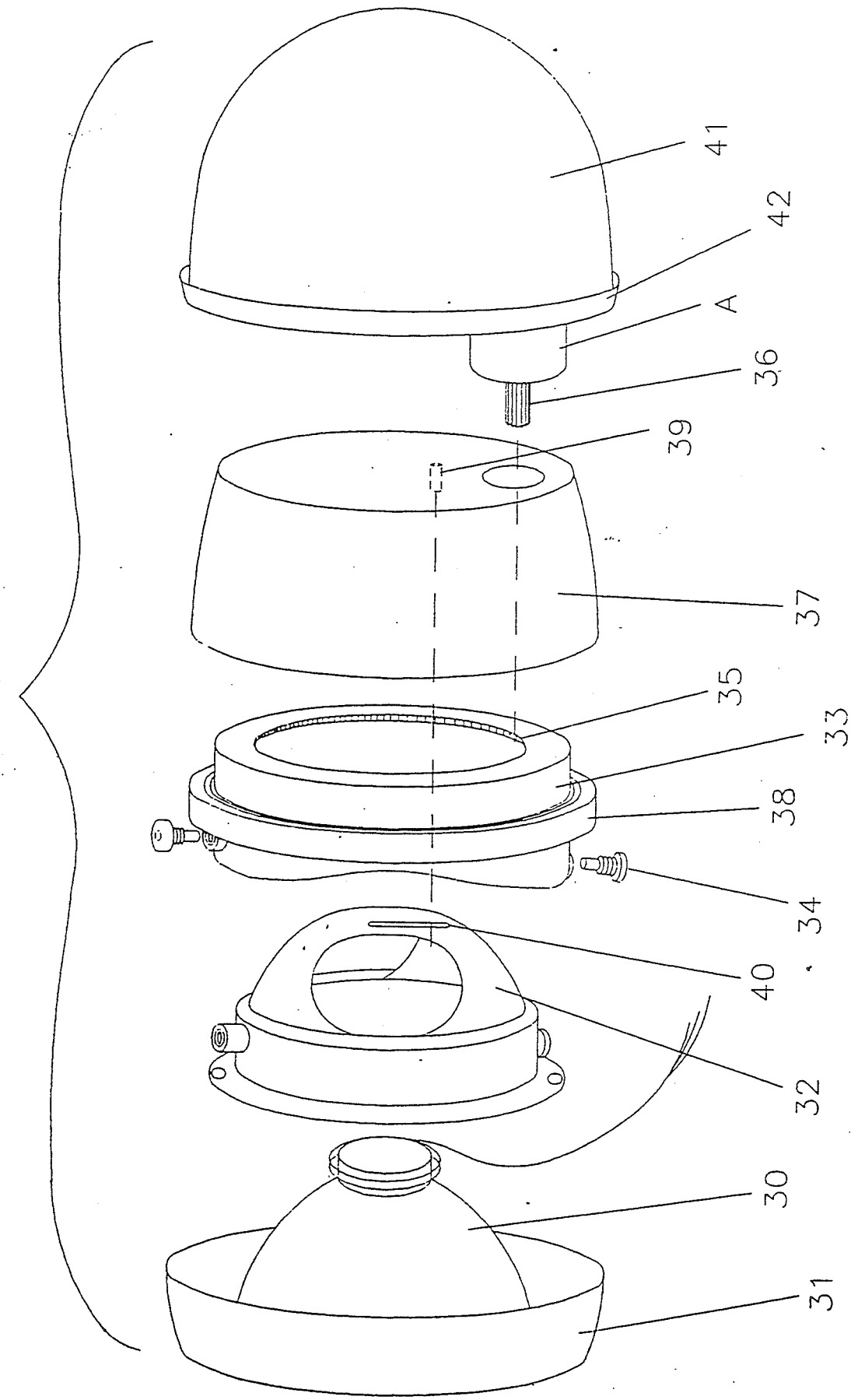
FIG. 1 is an exploded view of a fixed-pin embodiment of the Motorcycle Headlight Aiming Device.

A servomotor
B servomotor
C fixed center bearings
D movable center bearings
E pivot pin bearings
30 headlamp
31 front cowling
32 headlamp holder
33 inner shell
34 headlight assembly pivots
35 sector gear
36 pinion gear
37 outer shell
38 ball bearing
39 fixed bearing-point, or pin
39a bearing-point, or pin
40 vertical slot
40a slot
41 rear cowling
42 V-seal
43 distance sensors
44 motor bracket
45 movable bearing-point, or pin
46 sliding block
47 block guide
48 drive screw
49 drive gear
50 pinion gear
51 thrust bracket
52 speed sensor
53 perforated ring
54 rear brake disk
55 light source
56 light detector
57 ferrous core
58 electric coil
59 spring
60 rotor
61 stator
62 drive gear
63 sector gear
64 frame
65 ball-joint
66 pinion gear
67 sector gear
68 pivot gimbal
69 guides
70 horizontal slot
71 vertical slot
72 fixed bearing-point, or pin
73 movable bearing-point, or pin
74 sliding block
75 slotted guide
75 vane
76 vane arms
77 holes
78 vane pivot bearings
79 carriage lower bearing
80 pin carriage
81 link
82 spring
83 piston
84 cylinder
85 spring
86 flexible pipe or tube
87 valve body
88 valve seat
89 air inlet
90 air outlet
91 electric coil
92 ferrous core
93 tapered needle
94 spring
95 pressure balance tube
96 vane
97 rotary air bleed valve
98 spring
99 air outlet tube
100 air inlet tube
101 bearing-point ball-joint
102 rear headlight assembly upper ball-joint
103 rear headlight assembly lower ball-joint

SUMMARY

The Motorcycle Headlight Aiming Device detects the direction and degree of bank, tilt, or attitude of a vehicle relative to the road surface. This information is used to adjust the headlight beam of banking vehicles in order to provide optimum illumination on curves by changing the headlight beam orientation to better illuminate the forward path of the vehicle. Vehicle attitude information may also be used to aim a camera which is mounted to a banking vehicle. The Motorcycle Headlight Aiming Device can switch off a turn signal mechanism, and limit engine power at extreme angles of bank. Engine power may also be limited when sensor data indicates front wheel lift-off.

DETAILED DESCRIPTION/OPERATION OF A PREFERRED EMBODIMENT

Figure 2:
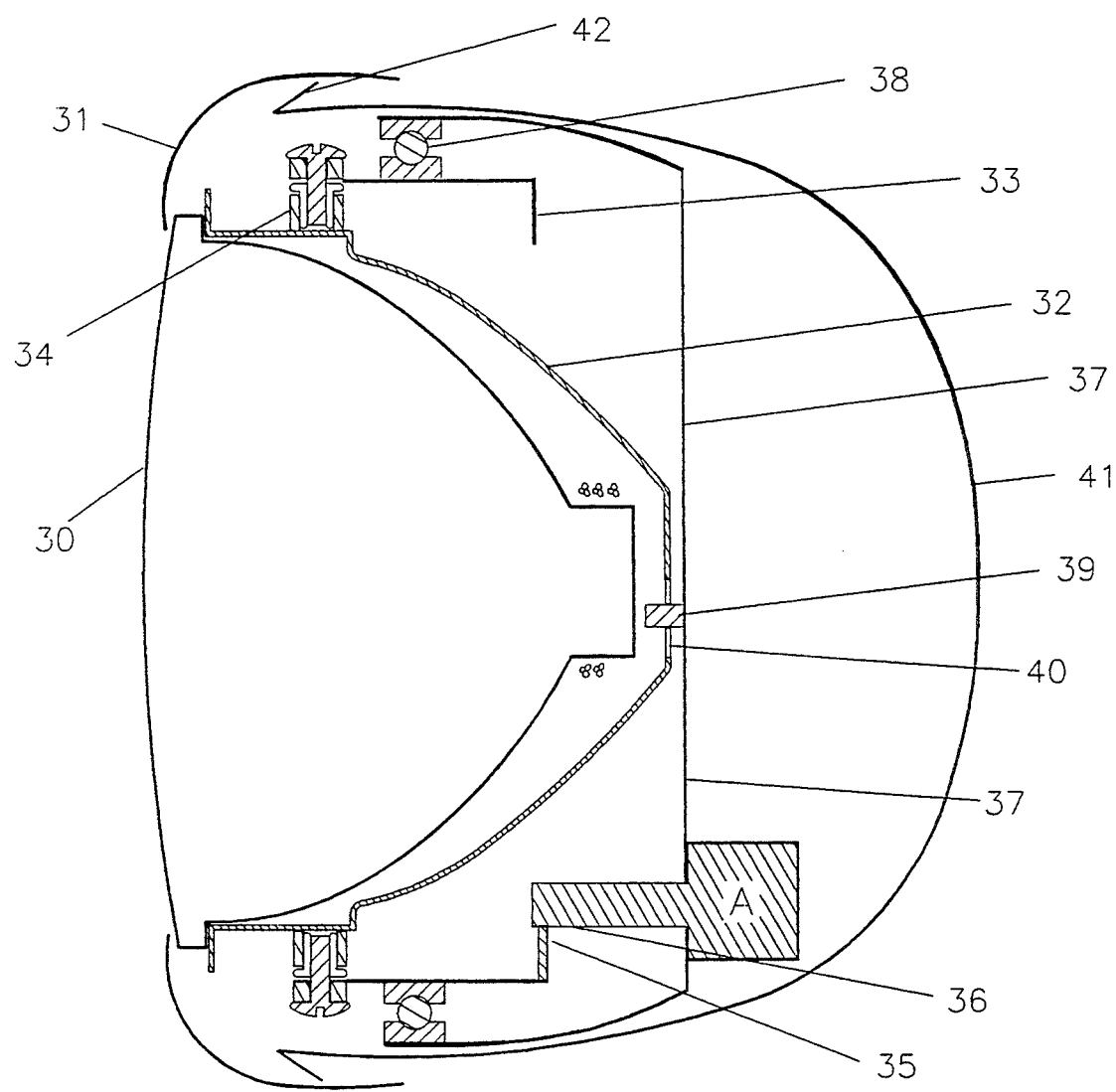
FIG. 2 is a cross-section longitudinally bisecting the Motorcycle Headlight Aiming Device of FIG. 1.

FIGS. 1 and 2 show, respectively, an exploded view and a cross-section view of the Motorcycle Headlight Aiming Device. The headlamp 30 is mounted between a front cowling 31 and a headlamp holder 32 which is attached to an inner shell 33 by means of two pivots 34. The pivot axis passes through, or close to, the center of gravity of the pivoting headlight assembly comprising headlamp 30, front cowling 31, and headlamp holder 32. Inner shell 33 has a sector gear 35 meshing with a pinion gear 36 driven by a servomotor A. Inner shell 33 is surrounded by a ball bearing 38 which is fixed to the inside of an outer shell 37. Motor A is attached to outer shell 37, as is a fixed bearing-point, or pin, 39, which engages with a vertical slot 40 at the rear of headlamp holder 32. The top of slot 40 is at or slightly below the axis of headlight rotation. A rear cowling 41 is mounted to outer shell 37 and to the motorcycle forks, frame or fairing by suitable brackets (not shown). The joint or annular opening between front cowling 31 and rear cowling 41 is sealed by a flexible V-seal 42.

Figure 3:
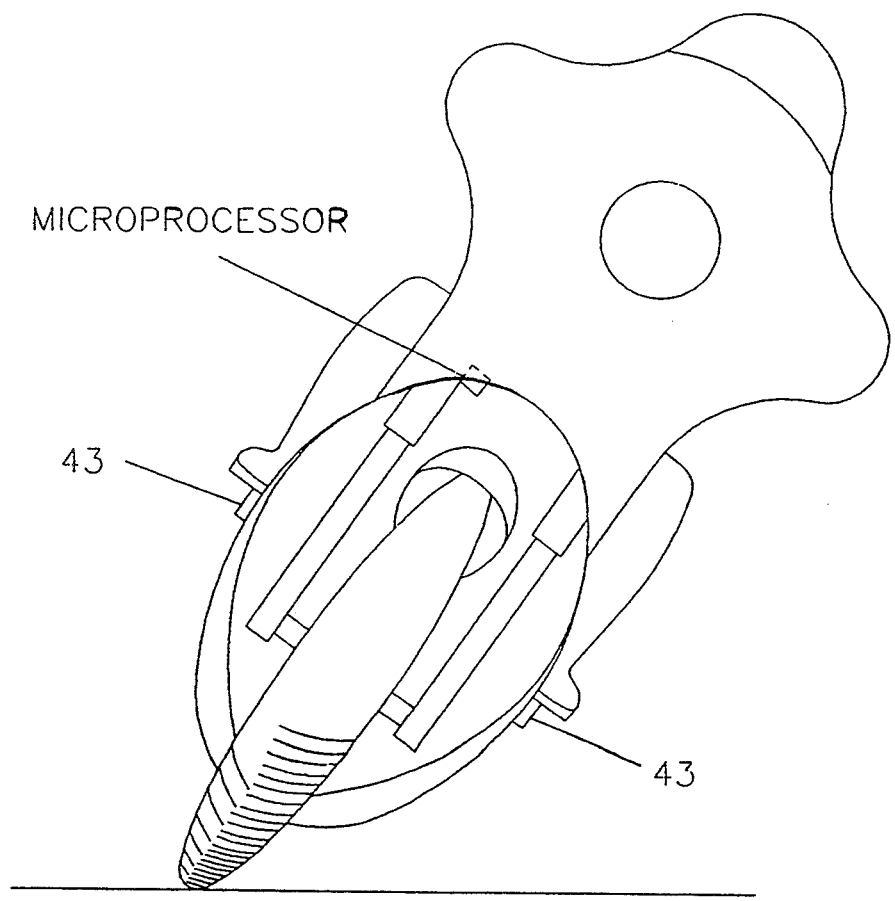
FIG. 3 is a head-on perspective view of a faired motorcycle, showing the location of two distance sensors.

FIG. 3 shows a head-on view of a motorcycle with a fairing. Distance measuring devices, or sensors, 43, each comprising an emittor radiating energy (sound, electromagnetic radiation, or light) approximately downward toward the road surface, a detector, which detects the energy reflected from the road surface, and a timing device to measure the time required for energy waves or pulses to return, are symmetrically mounted to the frame or fairing, equidistant from the plane of the motorcycle. The distance sensors are electrically connected to a small computer or microprocessor circuit (not shown) which can be mounted in any protected location on the motorcycle. The output from the microprocessor circuit controls the movement of servomotor A.

As the vehicle banks into a turn, sensors 43 measure the distance of each sensor from the road. The sensor closest to the road corresponds to the direction of the bank, and thus the direction of the turn. The difference between the measured values on each side of the vehicle is a function of the angle of bank.

The microprocessor circuit, using the data from sensors 43 causes servomotor A to rotate inner shell 33 about the axis of headlight rotation, or beam axis, by an amount equal and opposite to the degree of bank of the vehicle, so that the long dimension of the approximately rectangular cross-section of the beam pattern remains parallel to the road surface at any angle of bank. As the headlight assembly is rotated, pin 39, engaged with slot 40, causes the headlight assembly to pivot about the pivot axis, which remains perpendicular, or normal, to the road surface at any angle of bank.

Figure 4:
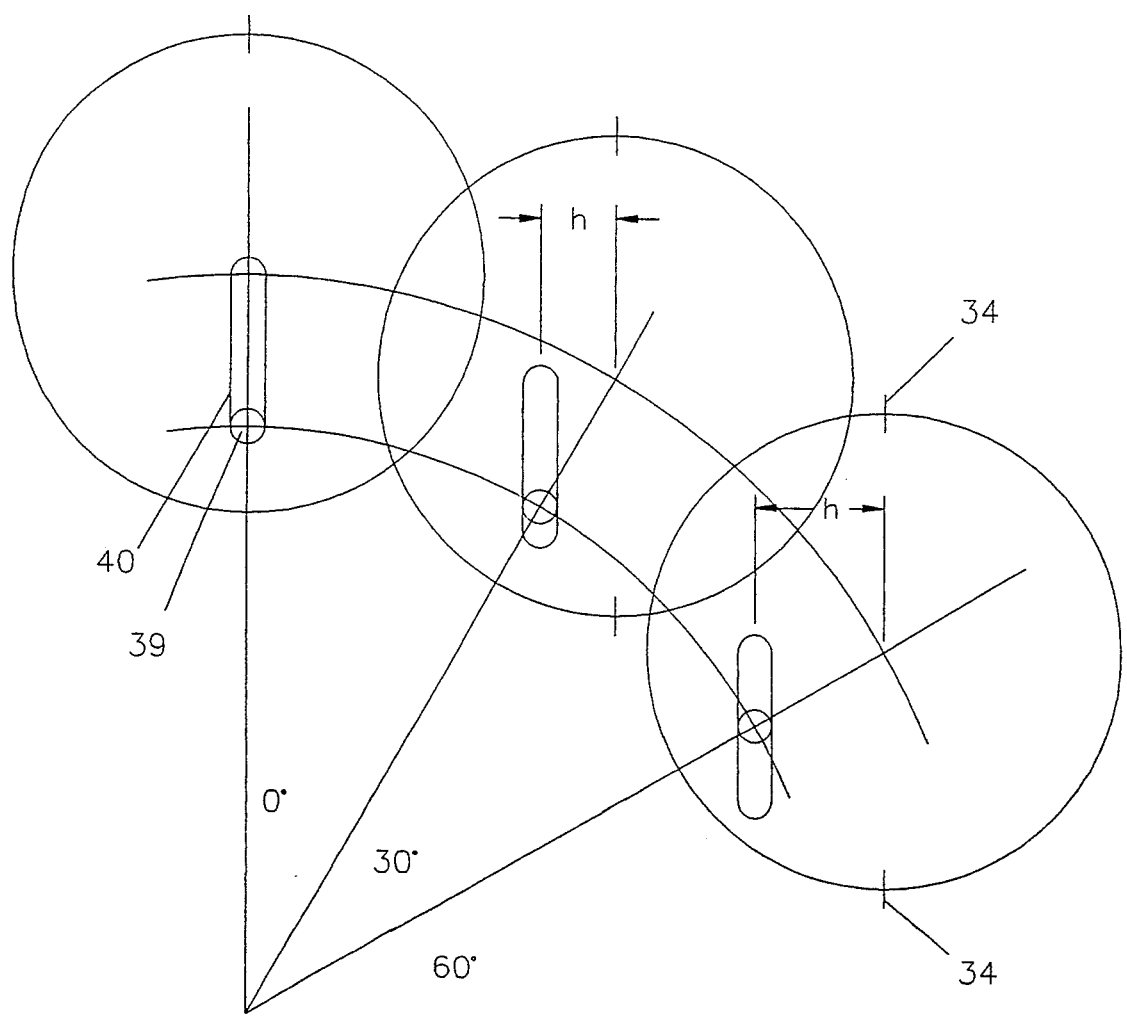
FIG. 4 is a schematic diagram of key elements of the fixed-pin embodiment of the Motorcycle Headlight Aiming Device at three angles of bank.

FIG. 4 shows the position of the headlight assembly at three angles of bank (0, 30, and 60 degrees from vertical). Pin 39, which is located a predetermined distance below the axis of headlight rotation, displaces slot 40 horizontally by a distance h, thus causing the headlight assembly to pivot a predetermined amount in the direction of the turn. The greater the angle of bank, the more the headlight assembly pivots.

Figure 5:
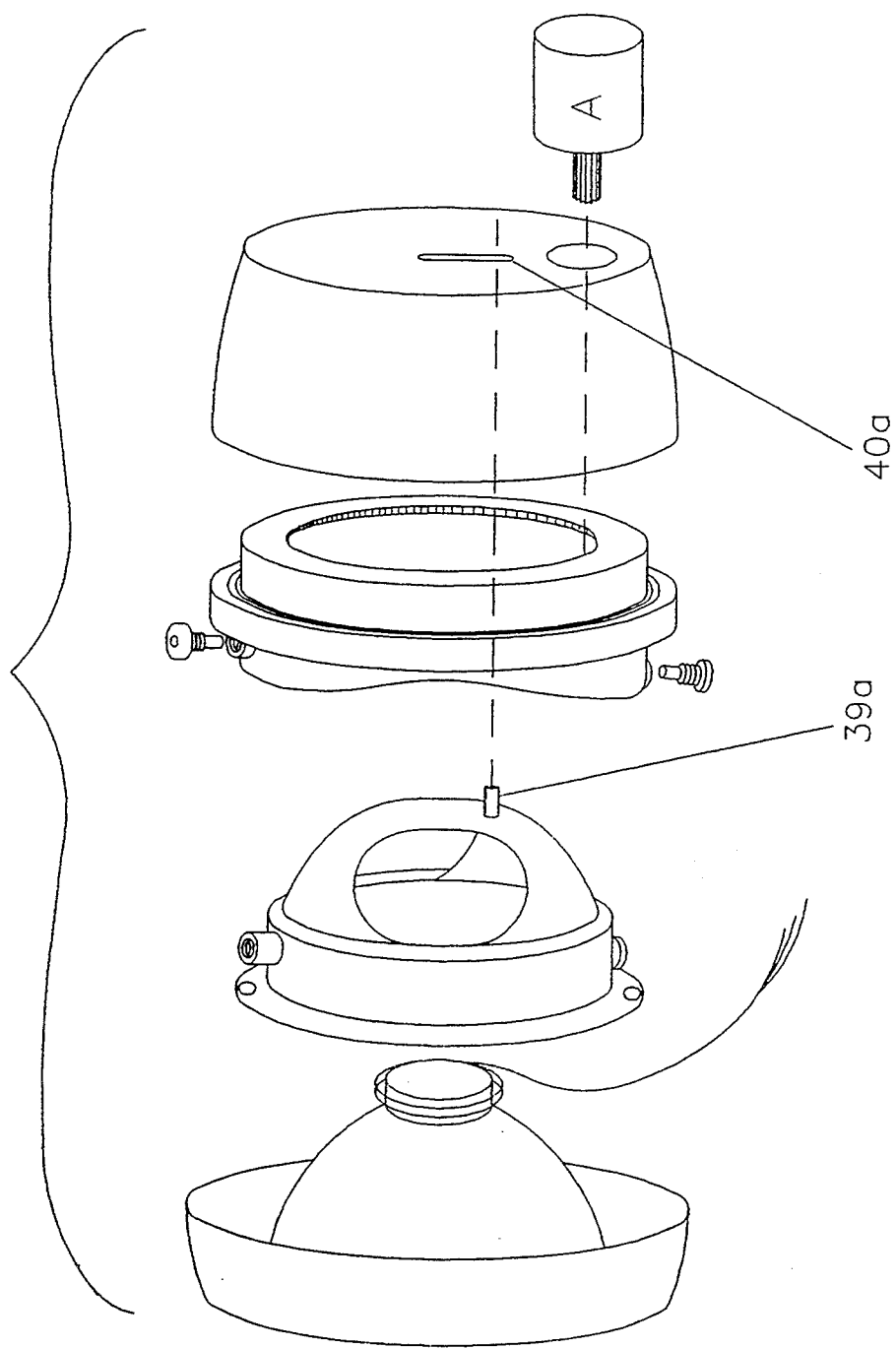
FIG. 5 is an exploded view of an alternate fixed-pin embodiment of the Motorcycle Headlight Aiming Device with the rear cowling not included.
Figure 6:
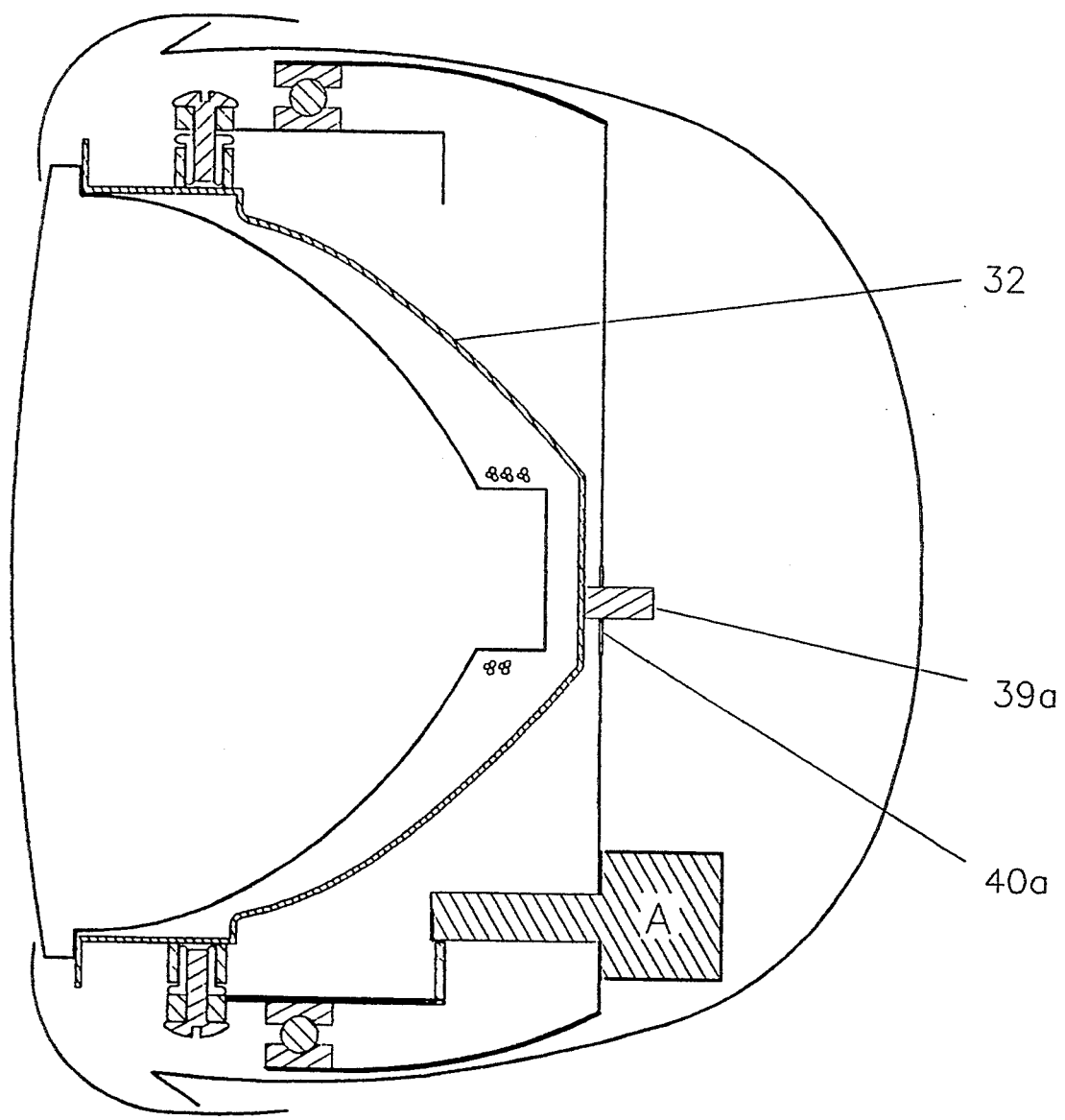
FIG. 6 is a cross section longitudinally bisecting the Motorcycle Headlight Aiming Device of FIG. 5 with the rear cowling included.
Figure 7:
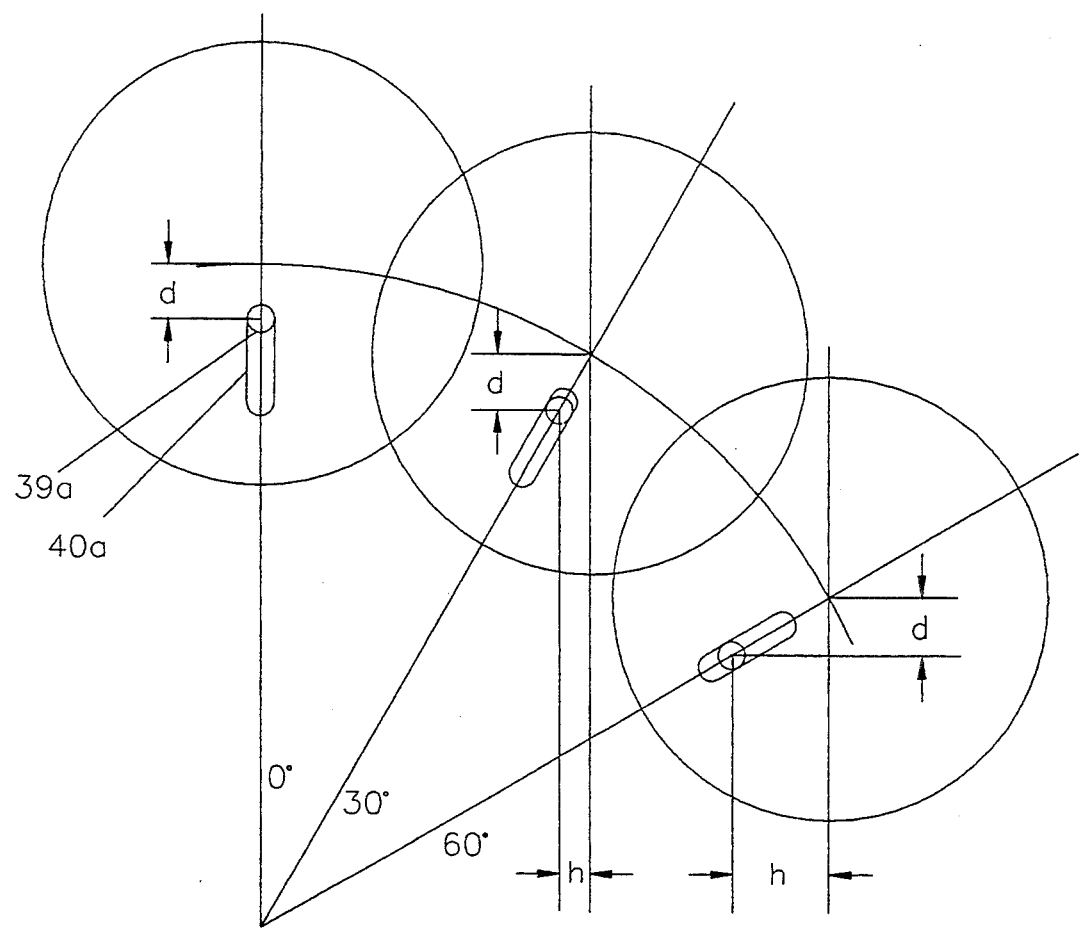
FIG. 7 is a schematic diagram of key elements of the alternate fixed-pin embodiment of the Motorcycle Headlight Aiming Device at three angles of bank.

FIGS. 5, 6, and 7—Description/Operation of Alternate Fixed Pin Embodiment

FIGS. 5, and 6 show a device similar to that shown in FIGS. 1 and 2, differing only in that a slot 40a is located in the outer shell and a bearing-point, or pin, 39a is attached to the rear of headlamp holder 32 at a predetermined distance below the headlamp axis of rotation.

FIG. 7 shows the position of the headlight assembly at three angles of bank (0. 20 and 60 degrees). If d is the distance of the pin 39a below the axis of rotation, h is the horizontal displacement of pin 39a and with it the rear of headlamp holder 32, at any given angle of bank.

FIGS. 8, 9, 10, 11 and 12—Description/Operation of Movable Pin Embodiment

Figure 8:
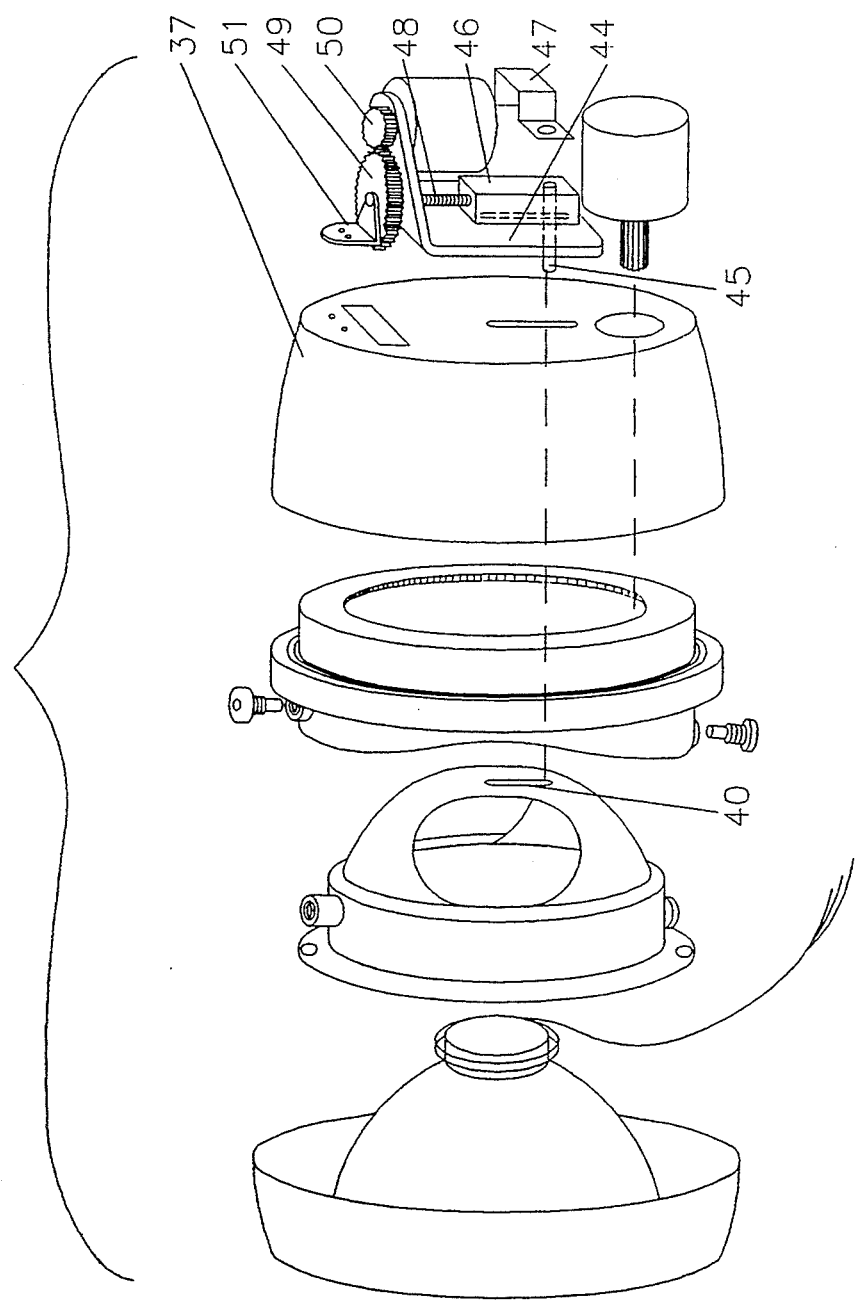
FIG. 8 is an exploded view of a movable-pin embodiment of the Motorcycle Headlight Aiming Device with the rear cowling not included.
Figure 9:
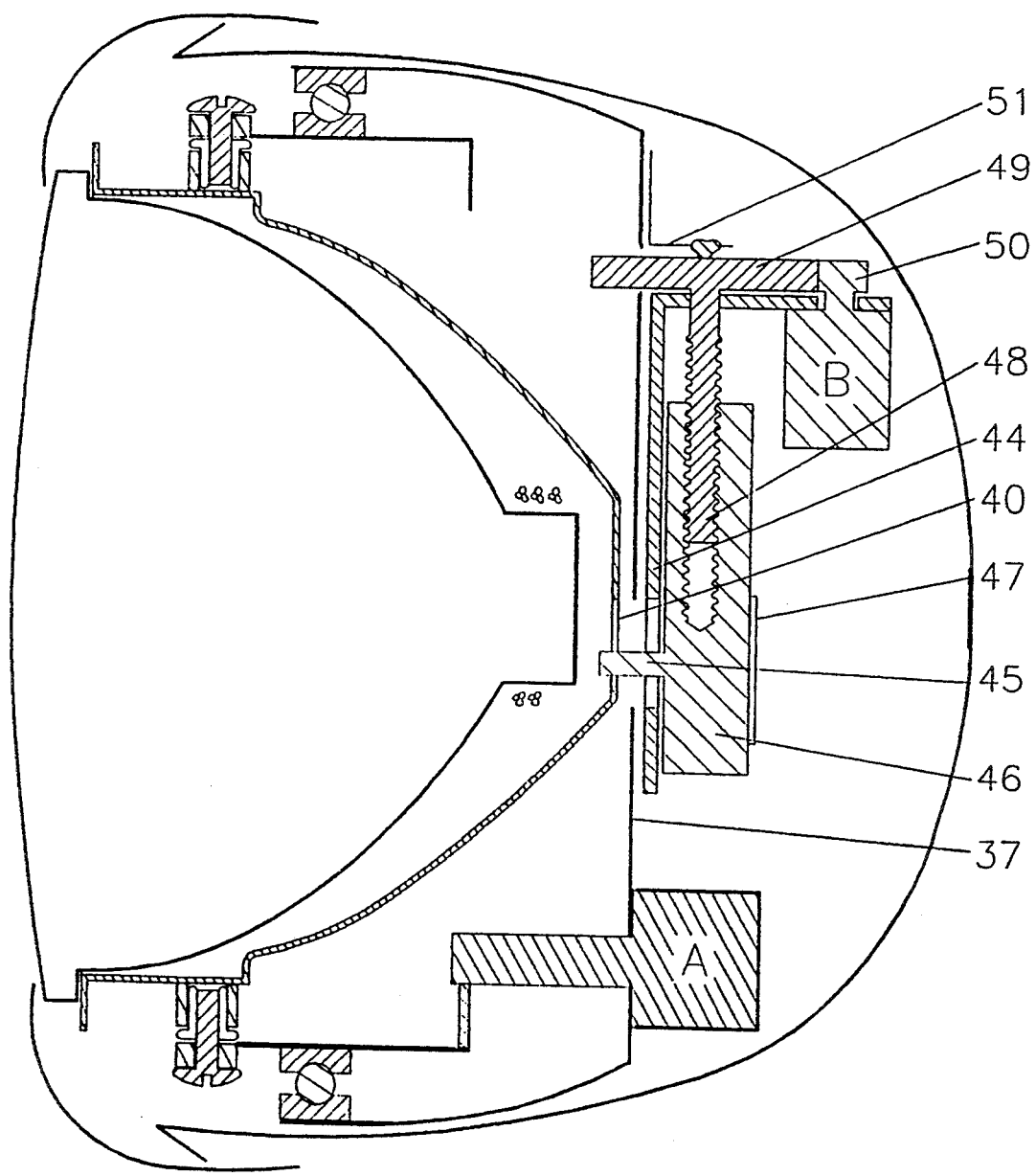
FIG. 9 is a cross section longitudinally bisecting the Motorcycle Headlight Aiming Device of FIG. 8 with the rear cowling included.

FIGS. 8 and 9 show an exploded view and a cross section, respectively, of the same device shown in FIGS. 1 and 2 above, except that this version has a movable bearing-point, or pin, 45 which can be moved towards or away from the axis of rotation, guided by slots, both in outer shell 37 and in a motor bracket 44 which is attached to outer shell 37. Movable pin 45 is mounted to a sliding block 46 which is free to move within a block guide 47. Block 46 is threaded to receive a drive screw 48. Drive screw 48 is connected to a drive gear 49 which meshes with a pinion gear 50 which is connected to a servomotor B mounted on motor bracket 44. A thrust bracket 51 is mounted to outer shell 37.

Figure 10:
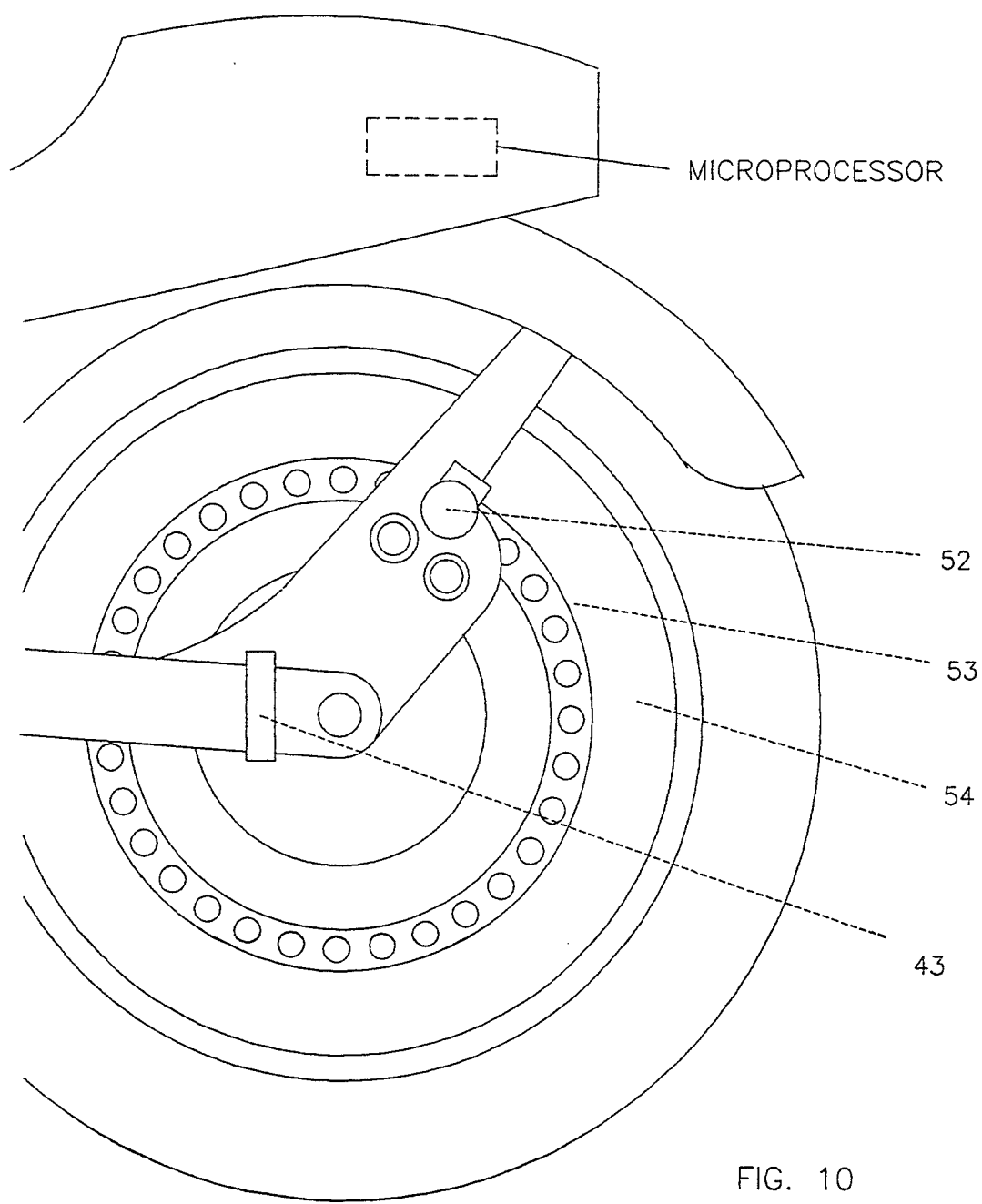
FIG. 10 is a side view of a motorcycle rear wheel assembly showing the location of a single distance sensor, a speed sensor, and a perforated ring mounted to the rear brake disk.
Figure 11:
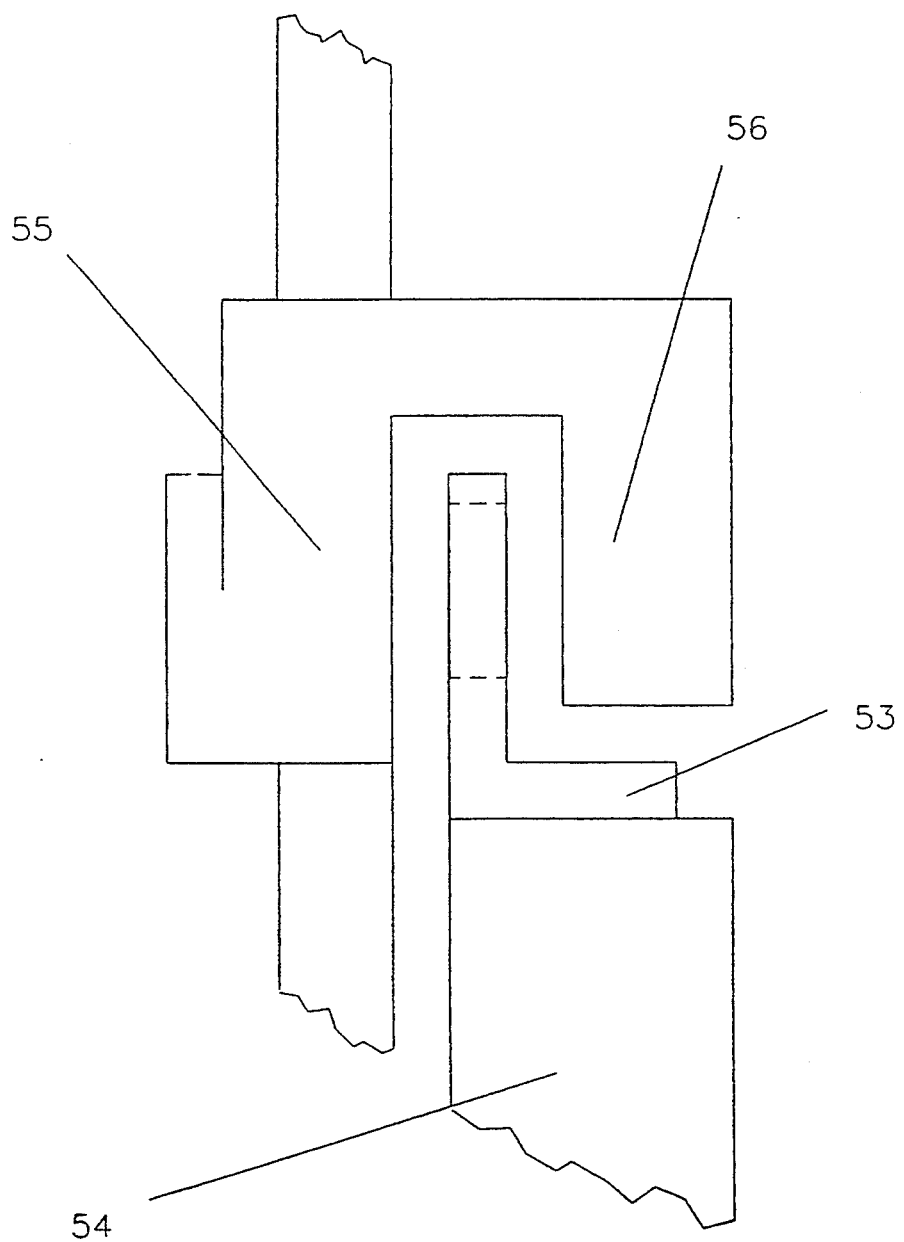
FIG. 11 is a rear view of the speed sensor shown in FIG. 10.

FIG. 10 shows a speed sensor 52 attached to the brake caliper mounting plate near the rear wheel hub. A perforated ring 53 is attached to the periphery of the rear brake disk 54 and rotates with the rear wheel. FIG. 11 is a rear view detail of sensor 52, viewed along a line tangent to ring 53 at sensor 52, and shows a light source 55 and a light detector 56. Perforated ring 53, turning between the light source and light detector interrupts the light at a frequency corresponding to the speed of the motorcycle.

If the motorcycle is travelling slowly, the turn will have a shorter radius for any given angle of bank. Conversely, at high speeds, the motorcycle may be sharply banked in a relatively straight curve. The degree to which the headlight beam should pivot on an axis normal to the road surface depends on the radius of the curve, which is a function of the angle of bank and an inverse function of the speed of the motorcycle.

The signal from detector 52, or from a conventional speedometer, is sent to a microprocessor circuit (not shown) which can be mounted in any protected location on the motorcycle, and which is designed to control motor B so that sliding block 46 will move pin 45 closer to the axis of headlight rotation at high speeds and further from the axis of rotation at low speed.

The same microprocessor may be programed to input data from an inertial device to sense acceleration/deceleration, in order to implement Hatanaka's concept of increasing beam pivot movement when decelerating toward the apex of a turn, and decreasing pivot motion when accelerating from the apex in order to better illuminate the straightaway ahead.

Figure 12:
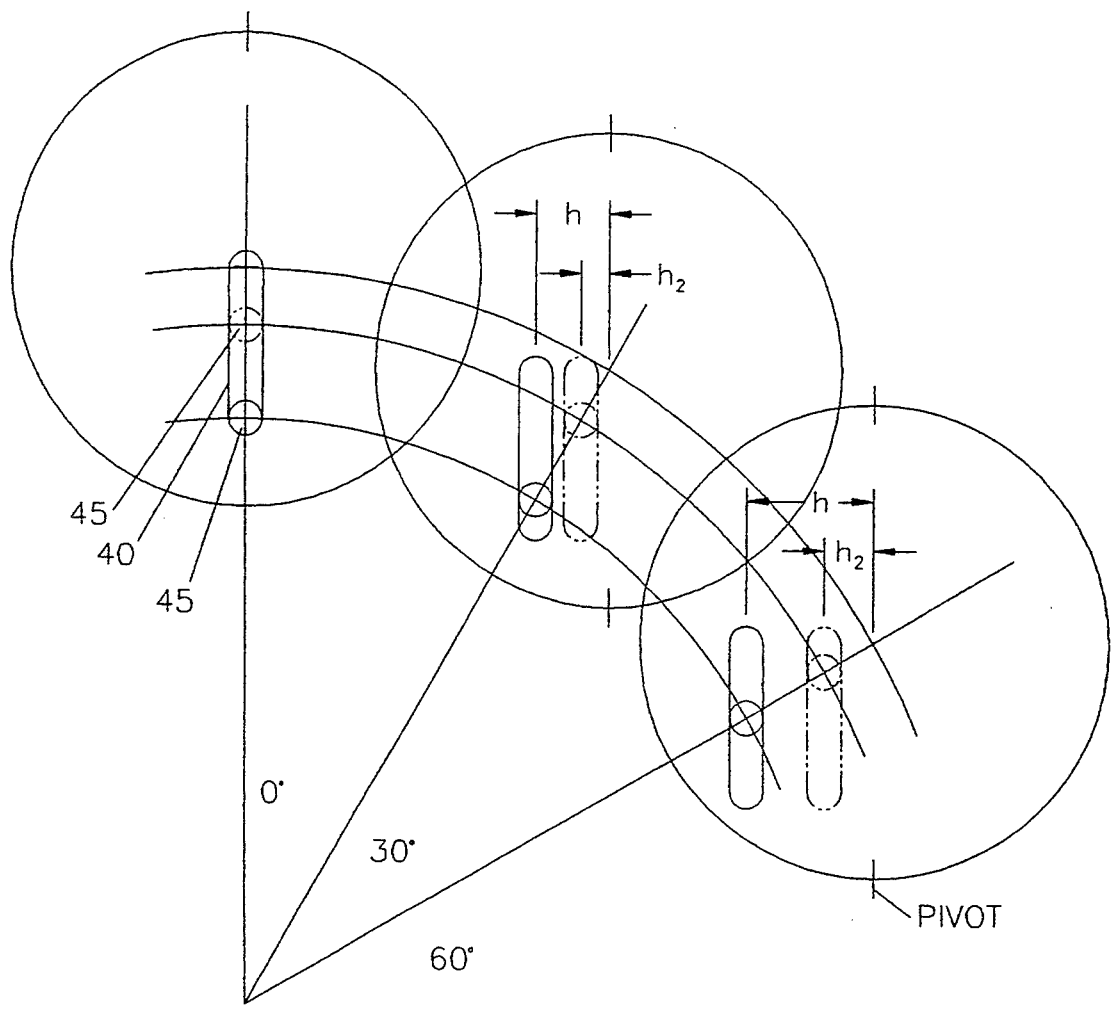
FIG. 12 is a schematic diagram of key elements of the movable-pin embodiment of the Motorcycle Headlight Aiming Device showing the relationship of these elements at two pin positions and at three angles of bank.

FIG. 12 shows how moving pin 45 closer to the axis of headlight rotation reduces the horizontal movement (h2) of slot 40, as illustrated by broken lines.

FIG. 10—Description/Operation of Single Distance Sensor Embodiment

The angle and direction of bank can also be determined by measuring the distance to the road surface on one side of the vehicle. When the motorcycle is banked toward the side on which the sensor is mounted, the distance between the sensor and the road surface decreases; when the motorcycle is banked in a direction away from the sensor, the distance increases. The output from the sensor is fed into a microprocessor circuit (not shown) which compares the measured distance to a preset value corresponding to the distance from the sensor to the road with the motorcycle upright, thus deriving the direction and angle of bank.

To avoid changes in distance between sensor and roadway caused by suspension travel, the sensor should be mounted on a wheel hub or on an unsprung suspension component. FIG. 10 shows a sensor 43 mounted at the end of the swingarm near the axle. This method of bank measurement would be less reliable in extreme conditions on poor roads, when tire compression and wheel hop or liftoff could cause erratic headlight beam movement, but would suffice for normal use.

Figure 13:
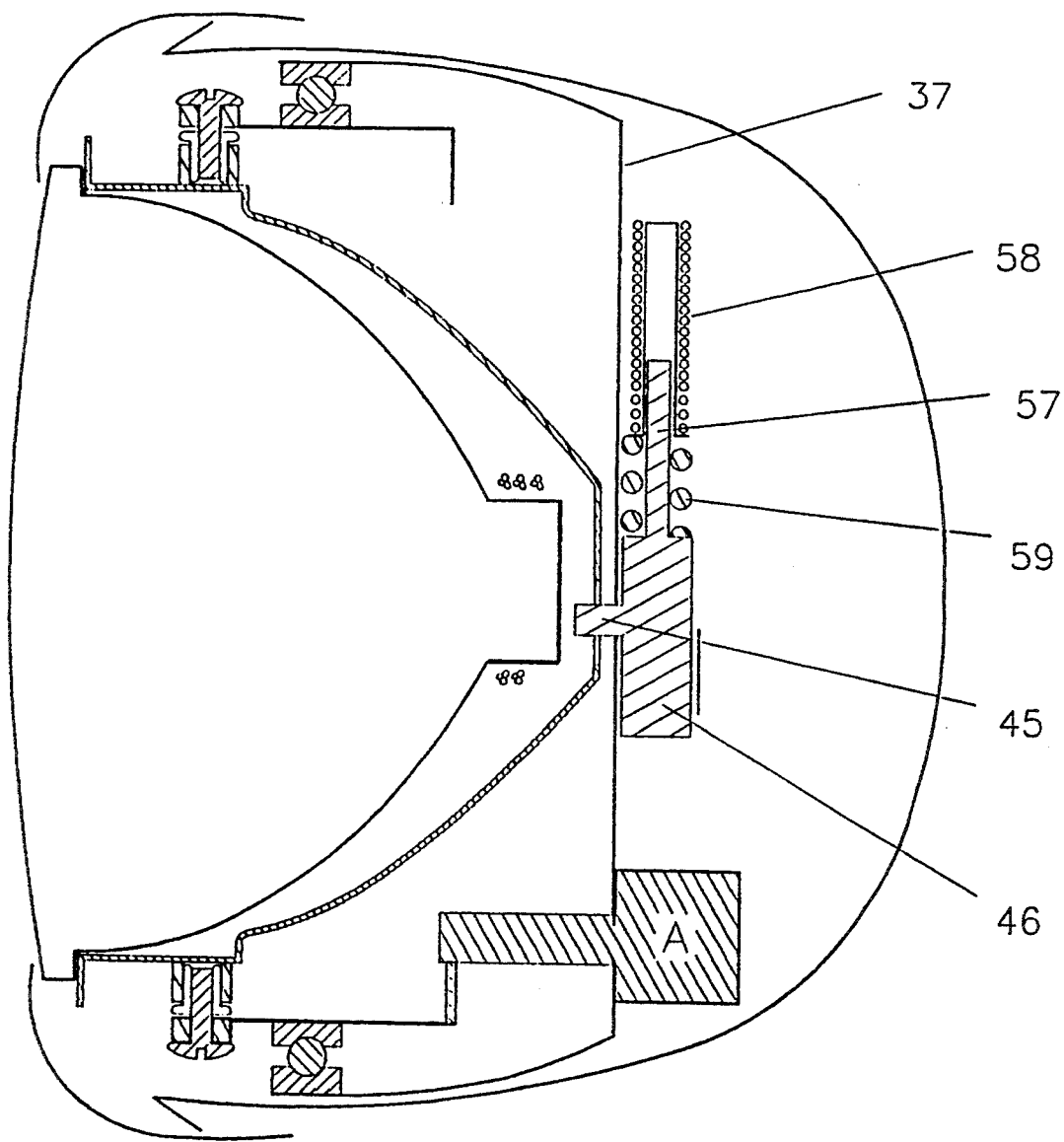
FIG. 13 is a cross section longitudinally bisecting the coil and alternator embodiment of the Motorcycle Headlight Aiming Device.
Figure 14:
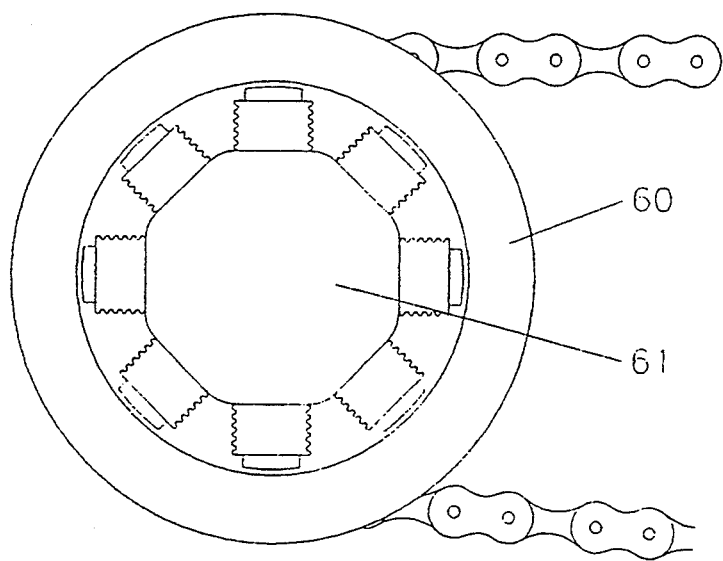
FIG. 14 is a side view of an alternator mounted outboard of a motorcycle gearbox sprocket.

FIGS. 13 and 14—Description/Operation of Coil and Alternator Embodiment

FIG. 13 is similar to the embodiment shown in cross section in FIG. 9, except that sliding block 46 is connected to a ferrous core 57 partly surrounded by an electric coil 58 mounted to outer shell 37. A spring 59 is placed between block 46 and coil 58. FIG. 14 shows an alternator mounted outboard of the gearbox sprocket comprising a rotor 60 which turns with the sprocket and a stator 61 which can be fixed to the sprocket outer cover (not shown).

Electric current from the alternator energizes coil 58, generating a magnetic field strength corresponding to vehicle speed, thereby drawing core 57 into coil 58 against the predetermined resistance of spring 59, and moving block 46 and pin 45 closer to the beam axis, thus reducing the headlight pivot angle correction. A counterweight mechanically linked to block 46 (not illustrated) will prevent road irregularities from influencing the movement of pin 45.

Figure 15:
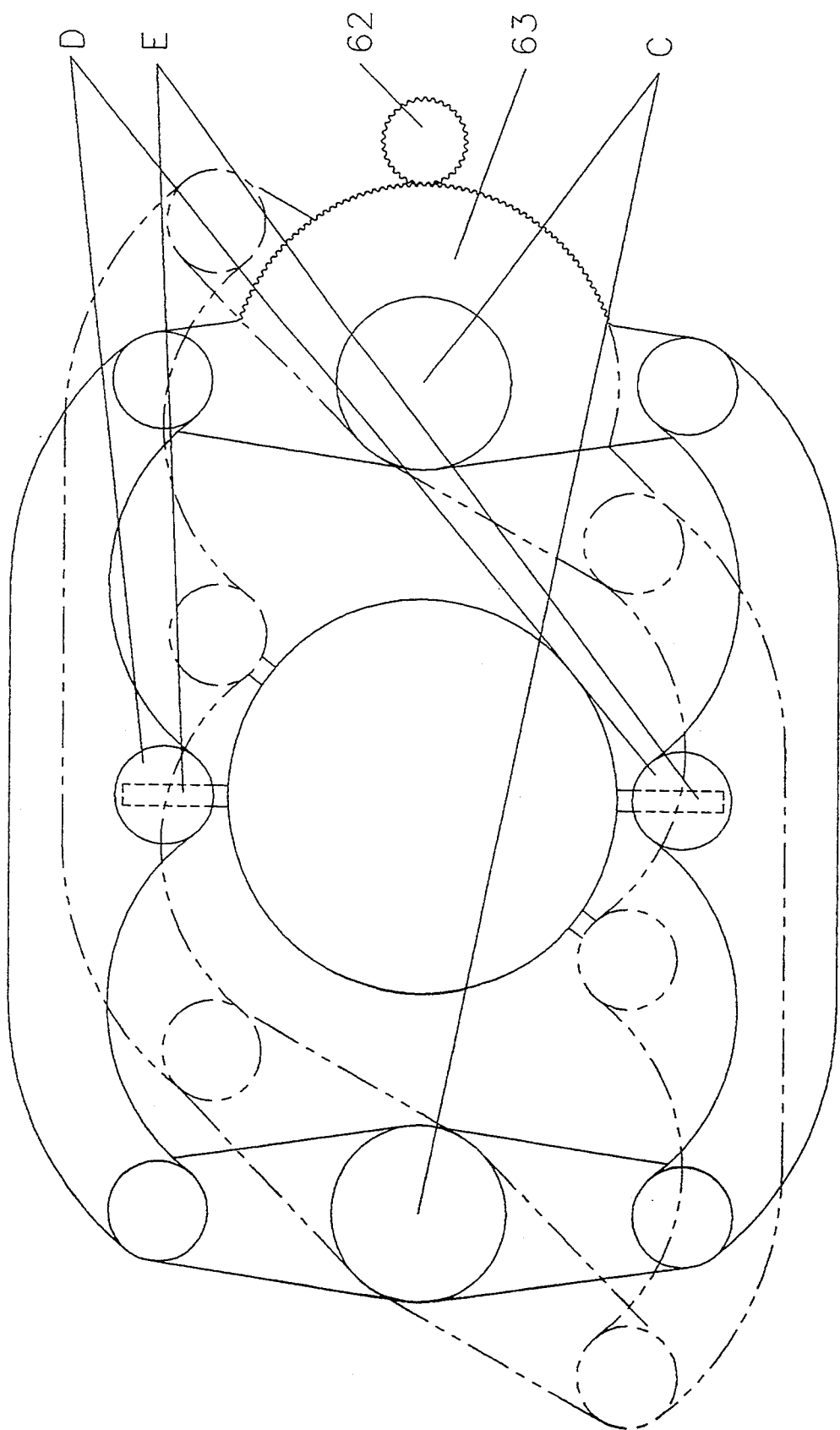
FIG. 15 is a diagrammatic view of a parallel linkage headlight assembly mount, with broken lines indicating an alternate position.

FIG. 15—Description/Operation of Parallel Linkage Mounting of Headlight Assembly A variation of the Motorcycle Headlight Aiming Device which does not require the large ball bearing, and is especially suited to fairing-mounted headlights is illustrated in FIG. 15, which shows an articulated linkage consisting of four links connected at their ends to form a parallelogram. At the center of each link is a bearing. Fixed center bearings C at the center of one pair of parallel links are connected to the motorcycle forks, frame, or fairing; movable center bearings D of the second pair of links are connected to the headlight assembly by pivot pin bearings E.

A drive gear 62 acting on a sector gear 63 concentric to one of the C bearings can cause the linkage to turn in one plane, clockwise or counterclockwise, as shown by broken lines in FIG. 15. This movement will keep the headlight assembly pivot axis normal to the road surface at all angles of bank; thus the linkage can substitute for the circumferential ball bearing shown in FIGS. 1 and 2. Moreover, by lengthening the links with the D bearings, a multiplicity of headlight assemblies may be mounted to a series of pivot pin bearings, all rotated by the same motor.

Figure 16:
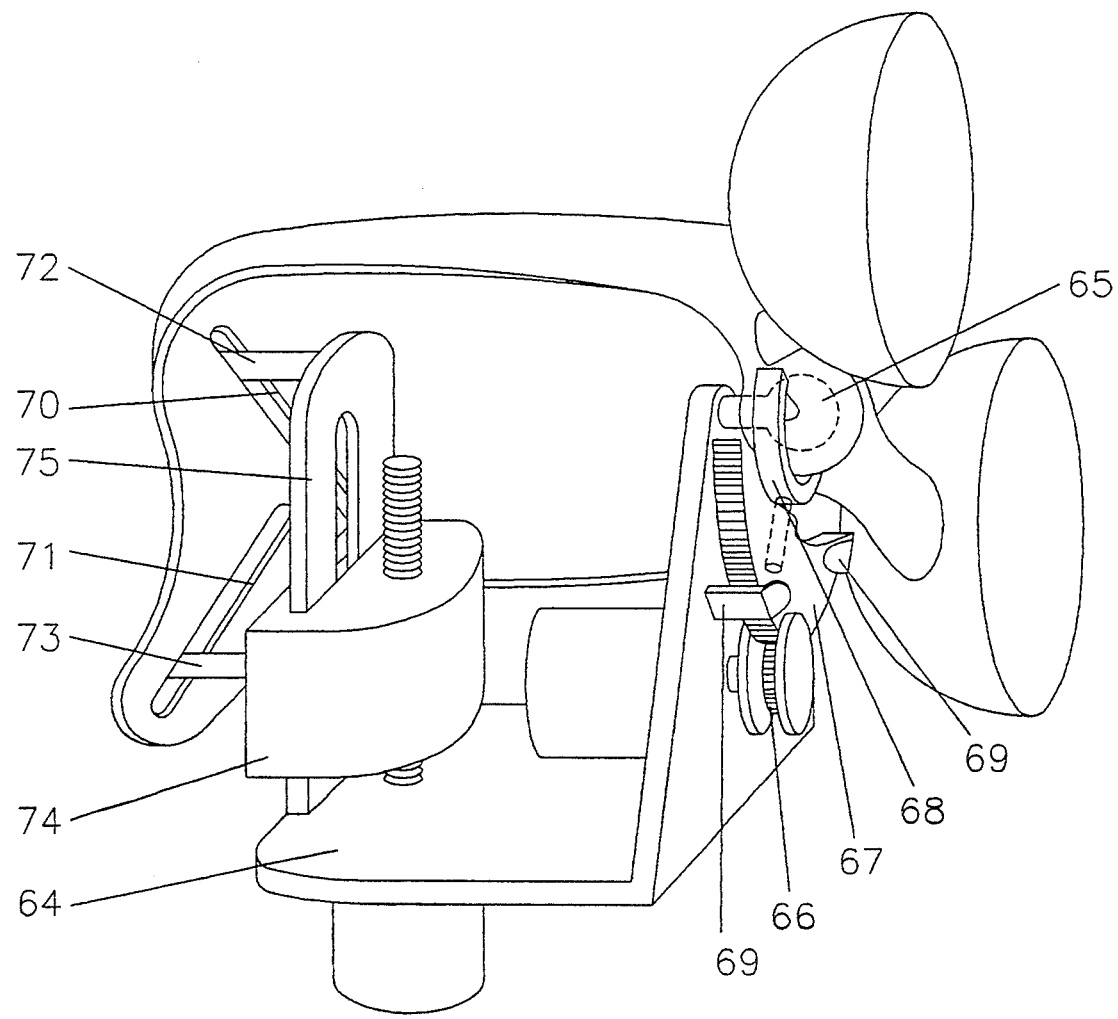
FIG. 16 is a perspective view of a ball-jointed movable-pin embodiment of the Motorcycle Headlight Aiming Device.
Figure 17:
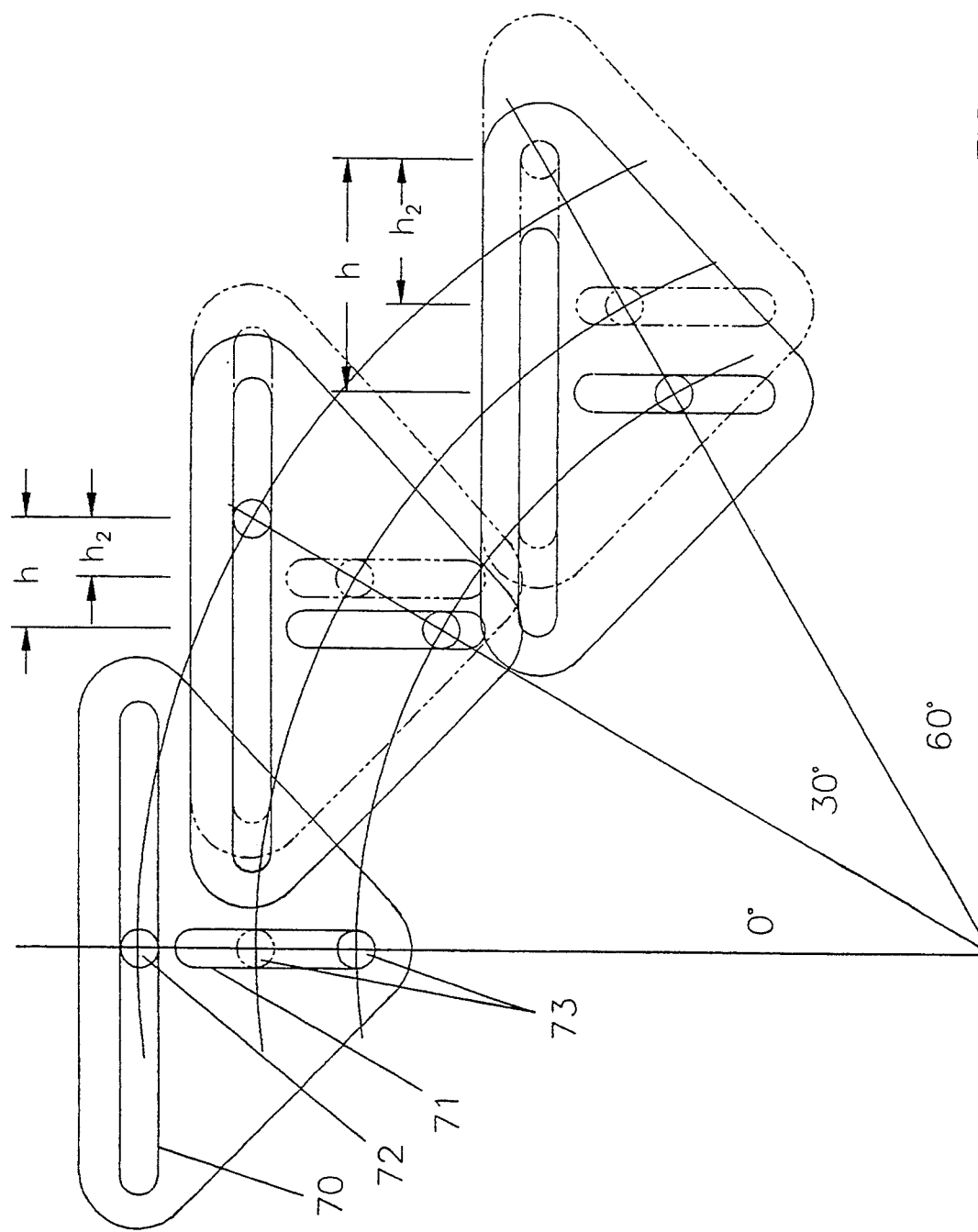
FIG. 17 is a schematic diagram of key elements of the ball-jointed movable-pin embodiment of the Motorcycle Headlight Aiming Device showing the relationship of these elements at two pin positions and at three angles of bank.

FIGS. 16 and 17—Description/Operation of Ball Joint Embodiment

FIG. 16 shows a Headlight Aiming Device comprising a frame 64 which is connected to a headlight assembly by a ball joint 65. A servomotor A is mounted to the frame. Motor A is connected to the headlight assembly by means of a pinion gear 66 engaged with a sector gear 67 which is attached to the headlight assembly by a yoke and pivot gimbal 68. Sector gear 67 is kept in alignment with pinion gear 66 by means of guides 69 mounted to frame 64. The rear of the headlight assembly has two slots at right angles in the form of a discontinuous T, one approximately horizontal 70, and one approximately vertical 71. Horizontal slot 70 engages a fixed bearing-point, or pin, 72 which is mounted on the rear of the frame. Vertical slot 71 engages a movable bearing-point, or pin, 73 mounted to a sliding block 74 which surrounds a flat slotted guide 75 which is part of the frame. The operation of this embodiment is similar to the movable pin embodiments previously described.

FIG. 17 shows the relationship of the pins with the T slots at three angles of bank, 0, 30 and 60 degrees, as in the description of FIG. 3 above. The roughly triangular shapes surrounding the slots represent the rear of the ball-jointed headlight assembly. H represents the approximately horizontal movement of slot 71 at various degrees of bank. The movement of the slots with movable pin 73 in an intermediate position is indicated by broken lines. The sole function of the fixed pin, which is mounted behind and slightly above the ball joint, and of horizontal slot 70 in the headlight assembly, is to allow the headlight assembly to pivot only in a horizontal plane or, more accurately, in a plane parallel to the road surface.

The headlight assembly in FIG. 16 shows dual headlights. By using small quartz-halogen units now available for cars, this configuration could be made small enough to fit behind a protective lens no larger than a normal headlight lens.

Figure 18:
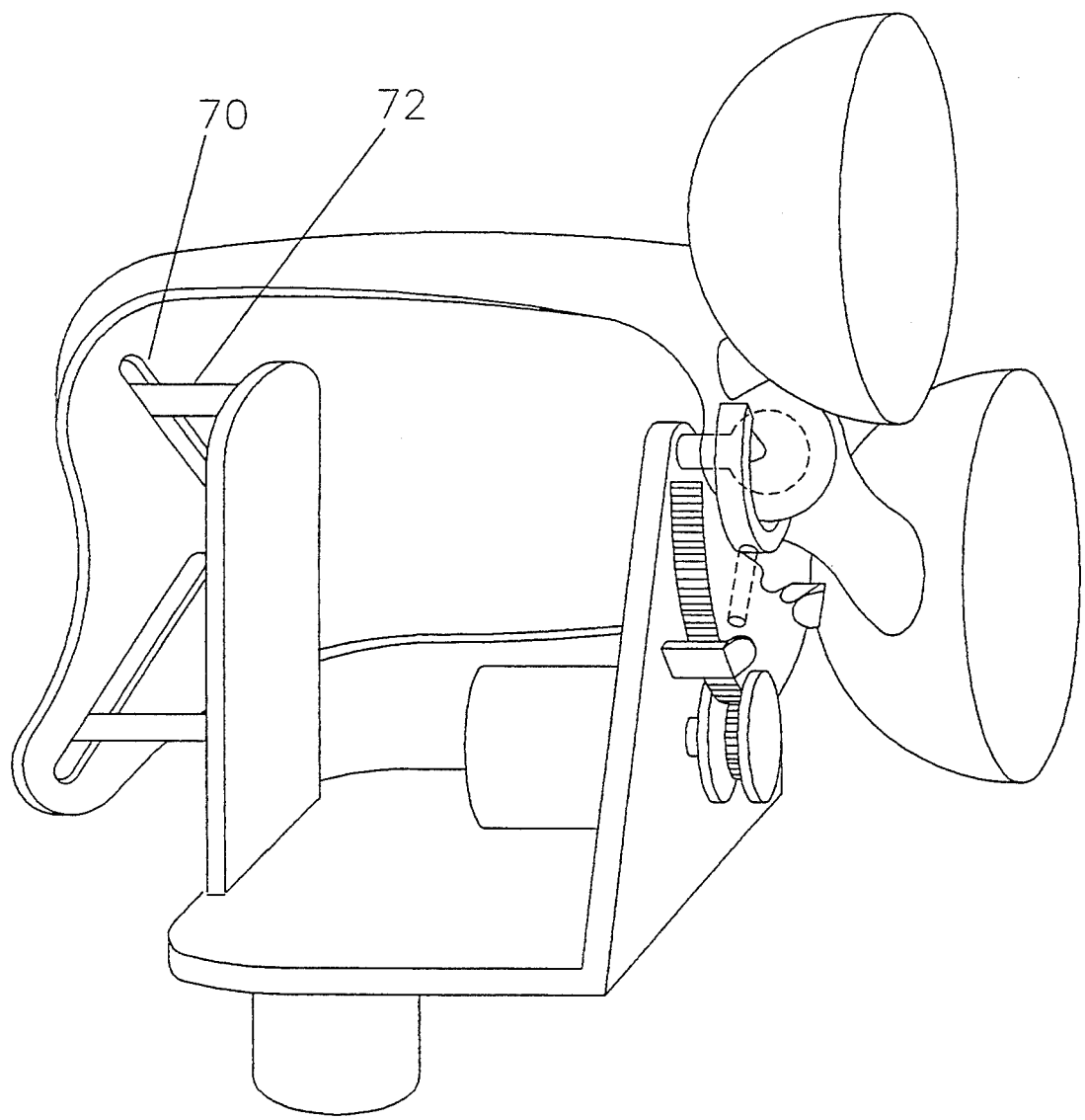
FIG. 18 is a perspective view of a ball-jointed fixed-pin embodiment of the Motorcycle Headlight Aiming Device.

FIG. 18—Description/Operation of Ball Jointed Embodiment with Fixed Pins

FIG. 18 shows an embodiment similar to that in FIG. 16, except that both pins are fixed. As in the Fixed Pin Embodiment illustrated in FIGS. 1 and 2, this version uses a wide beam cross section to better illuminate the road at various speeds. This version is compact and can easily be adapted to a variety of current motorcycle models. The ball joint and single motor make it inexpensive to produce, and the redundancy of the dual headlamps gives an increased margin of safety.

Figure 19:
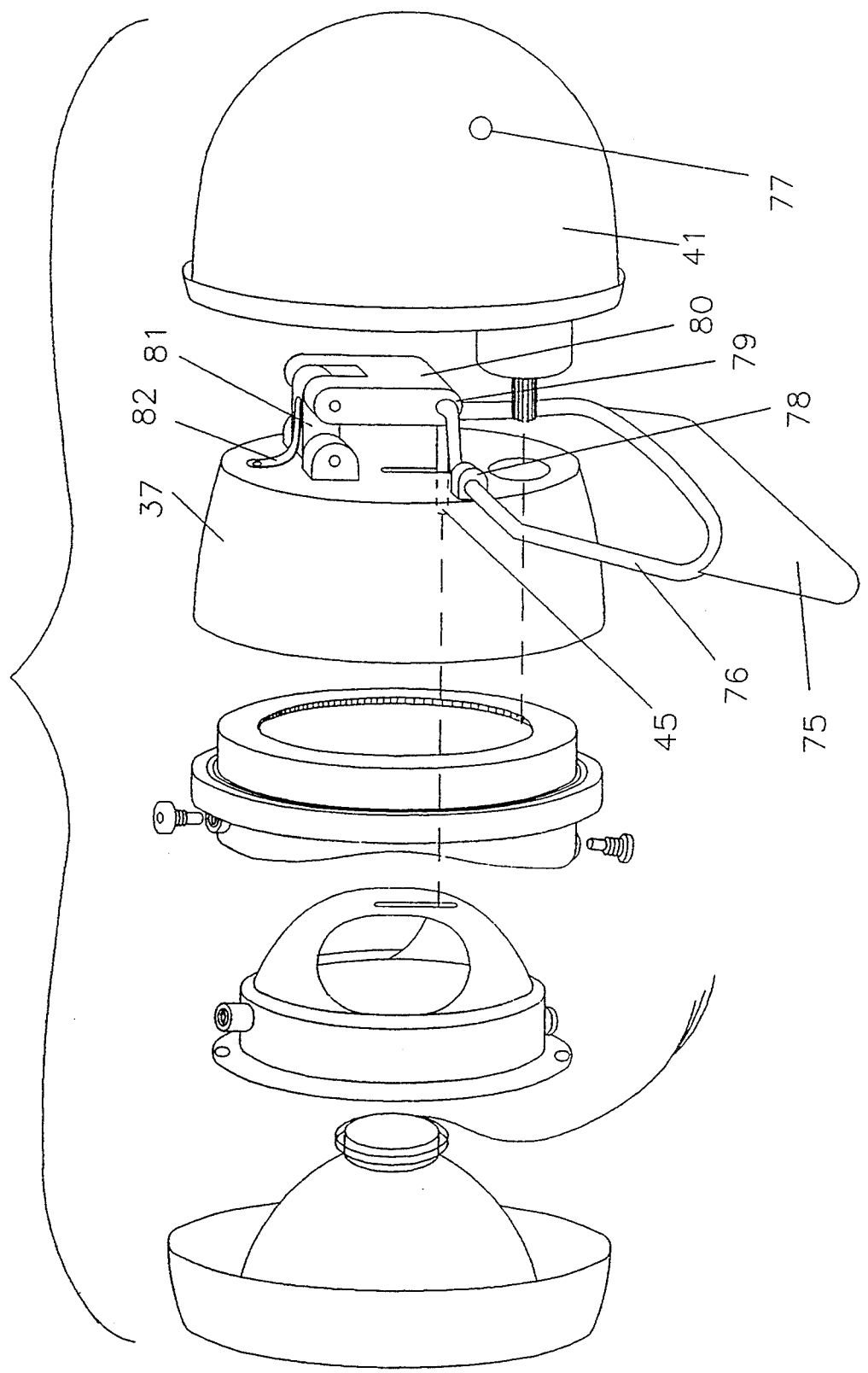
FIG. 19 is an exploded view of a vane and linkage embodiment of the Motorcycle Headlight Aiming Device.

FIG. 19—Description/Operation of Embodiment with Vane and Linkage

FIG. 19 shows an embodiment similar to that in FIGS. 8 and 9, except that movable pin 45 is linked to a vane 75 of predetermined size and shape which is located outside and below headlight cowling 41. Vane 75 is attached to two vane arms 76 extending inward through two holes 77 in rear cowling 41, and which pivot on vane pivot bearings 78 mounted to outer shell 37. Between bearings 78, arms 76 extend rearward a short distance to meet in carriage lower bearing 79 at the bottom end of a pin carriage 80. Pin 45 is attached to the front face of carriage 80, which is flexibly connected to link 81, which, in turn, is flexibly connected to outer shell 37, forming a parallel linkage which maintains pin 45 in an orientation parallel to the headlight beam axis. Spring 82 exerts a downward force on pin carriage 80.

Wind pressure due to the forward motion of the motorcycle forces vane 75 rearwards against the predetermined force of spring 82, acting through the linkage described above, to a distance roughly proportional to vehicle speed, thereby moving pin 45 toward the axis of headlamp rotation. Thus at higher speeds, the degree of headlight beam pivot angle is reduced for any angle of bank. Counterweights may be added to provide balance against G forces, bumps, and acceleration/deceleration. If, however, some of the horizontally moving mass of the vane and linkage is left unbalanced, the Hatanaka concept of compensating for acceleration/deceleration to better illuminate the apex and exit of a turn will be realized, since acceleration will tend to move vane 75 rearward, thus reducing the pivot angle, while deceleration will tend to move the vane forward, increasing the pivot angle for any angle of bank.

Figure 20:
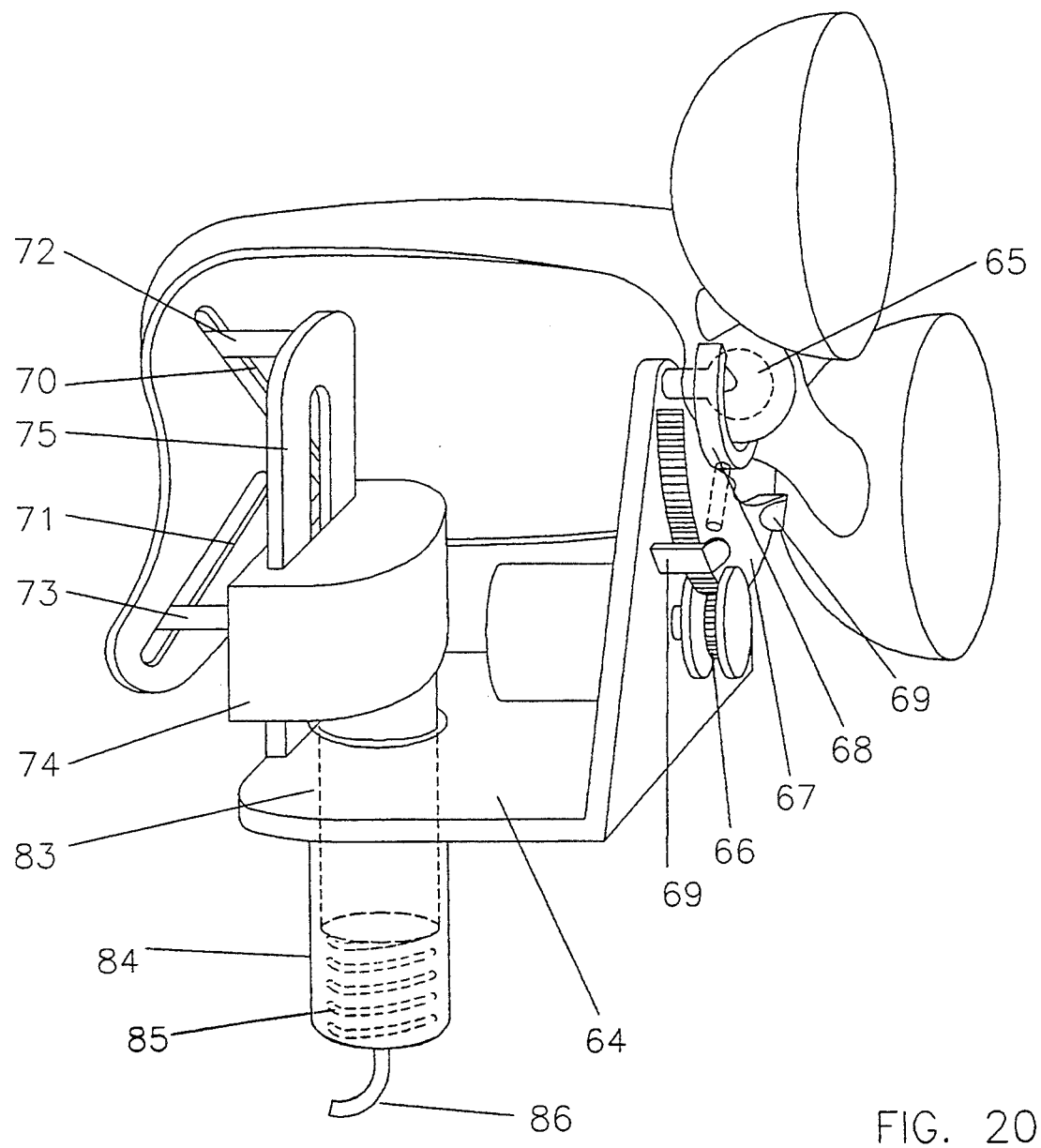
FIG. 20 is a perspective view of a ball-jointed embodiment of the Motorcycle Headlight Aiming Device using a piston to position the movable pin.
Figure 20A:
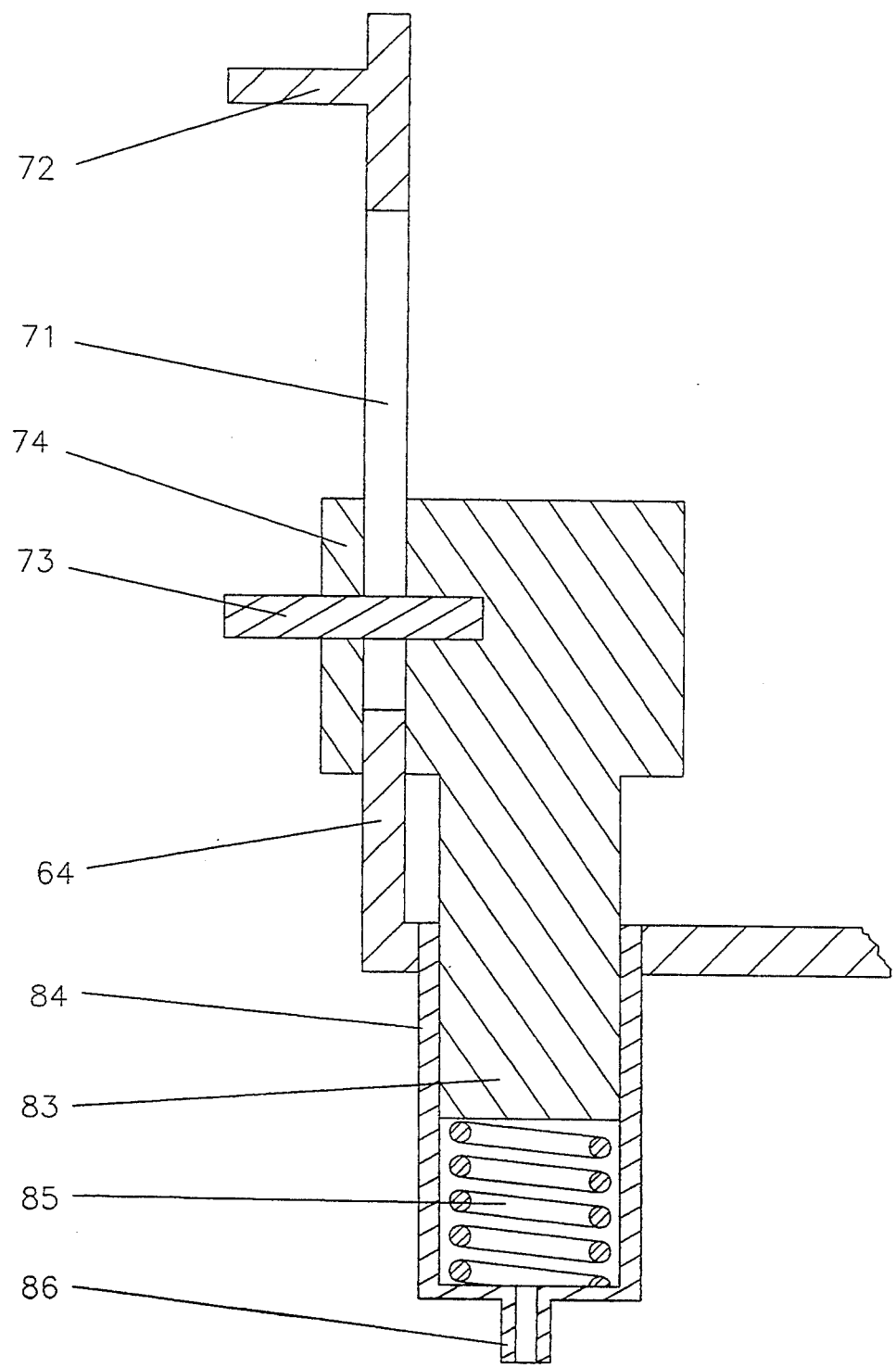
FIG. 20A is a cross-sectional view of the piston and movable pin detail of the embodiment illustrated in FIG. 20.

FIGS. 20 and 20A—Description/Operation of Embodiment Using Engine Vacuum to Control Movable Pin FIG. 20 shows an isometric view, and FIG. 20A a detail in section of an embodiment similar to that in FIG. 16, except that block 74 is part of a piston 83 contained in a cylinder 84 mounted to the bottom of frame 64. Piston 83 protrudes through a hole in frame 64. A spring 85 is mounted inside cylinder 84 between piston 83 and cylinder 84. Cylinder 84 is pneumatically connected by a flexible pipe or tube 86 to the engine intake manifold (not shown).

At low speeds, and when decelerating, the engine intake manifold pressure is low, causing atmospheric pressure at the top of piston 83 to move piston 83, block 74, and movable pin 73 away from fixed pin 72, against the predetermined force exerted by spring 85, increasing the degree to which the headlight assembly pivots at any angle of bank. As the throttle is opened while accelerating, or at higher speeds, intake manifold pressure increases correspondingly, allowing spring 85 to move piston 83, block 74, and pin 73 closer to fixed pin 72, reducing the degree to which the headlight assembly pivots at any angle of bank. Different piston sizes, different spring rates, variable spring rates, and variations in pin/slot geometry will adapt this embodiment to a wide range of motorcycles. A predetermined amount of viscous damping or air flow restriction to increase piston response time is desirable in order to minimize the effect of the short power bursts used in downshifting.

Description/Operation of Embodiment Using Air Bleed Valve to Further Control the Movable Pin Shown in FIG. 20

Figure 21:
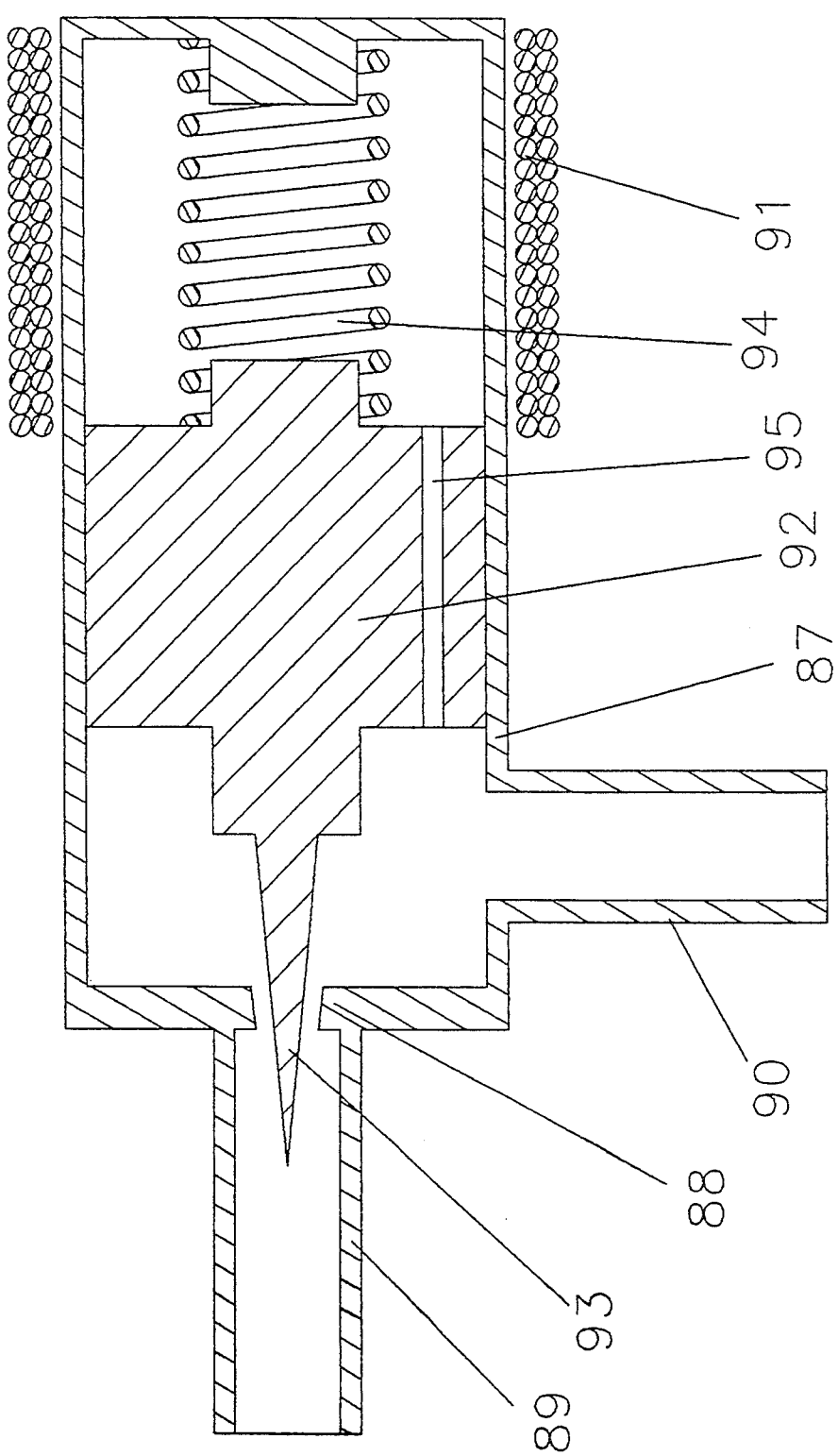
FIG. 21 is a longitudinal cross-section of an electrically operated air bleed valve.

This embodiment is similar to that in FIG. 20 except that an air bleed valve is connected to tube 86. FIG. 21 shows a magnetically actuated air bleed valve located near the engine intake manifold. A cylindrical valve body 87, with a valve seat 88 leading to an air inlet 89 and an air outlet 90, is surrounded by an electric coil 91 at the end opposite to valve seat 88. A cylindrical ferrous core 92 within valve body 87 has a tapered needle 93 at one end which enters valve seat 88, and a spring 94 at the other end. Spring 94 is positioned by spring keepers at each end. A pressure equalizing tube 95 pneumatically connects both ends of core 92.

When decelerating at high speed with the throttle closed, low manifold pressure could cause the headlight in the embodiment shown in FIG. 18 to pivot too far. In this version coil 91 is energized, either by an electrical current supplied by electronic means derived from a speedometer or speed sensor, or simply from an alternator driven by a final drive component as shown in FIG. 14. The magnetic field of coil 91 increases with vehicle speed, moving core 92 against the predetermined force of spring 94, and withdrawing needle 93 from valve seat 88. Tube 95 equalizes air pressure at each end of core 92, thereby preventing unequal air pressure from affecting valve operation.

Thus increased vehicle speed progressively introduces filtered air at near-atmospheric pressure into tube 86 from air outlet 90, thereby increasing the air pressure below piston 83 and reducing the distance between pins 73 and 72 so that the headlight pivot angle is corrected for vehicle speed. If the air bleed valve is transversely mounted, the effect of core inertia under acceleration and deceleration will not affect needle position. Because the capacity of the air bleed valve is extremely small in comparison to the capacity of the intake manifold, intake fuel-air mixture is unaffected.

Figure 22:
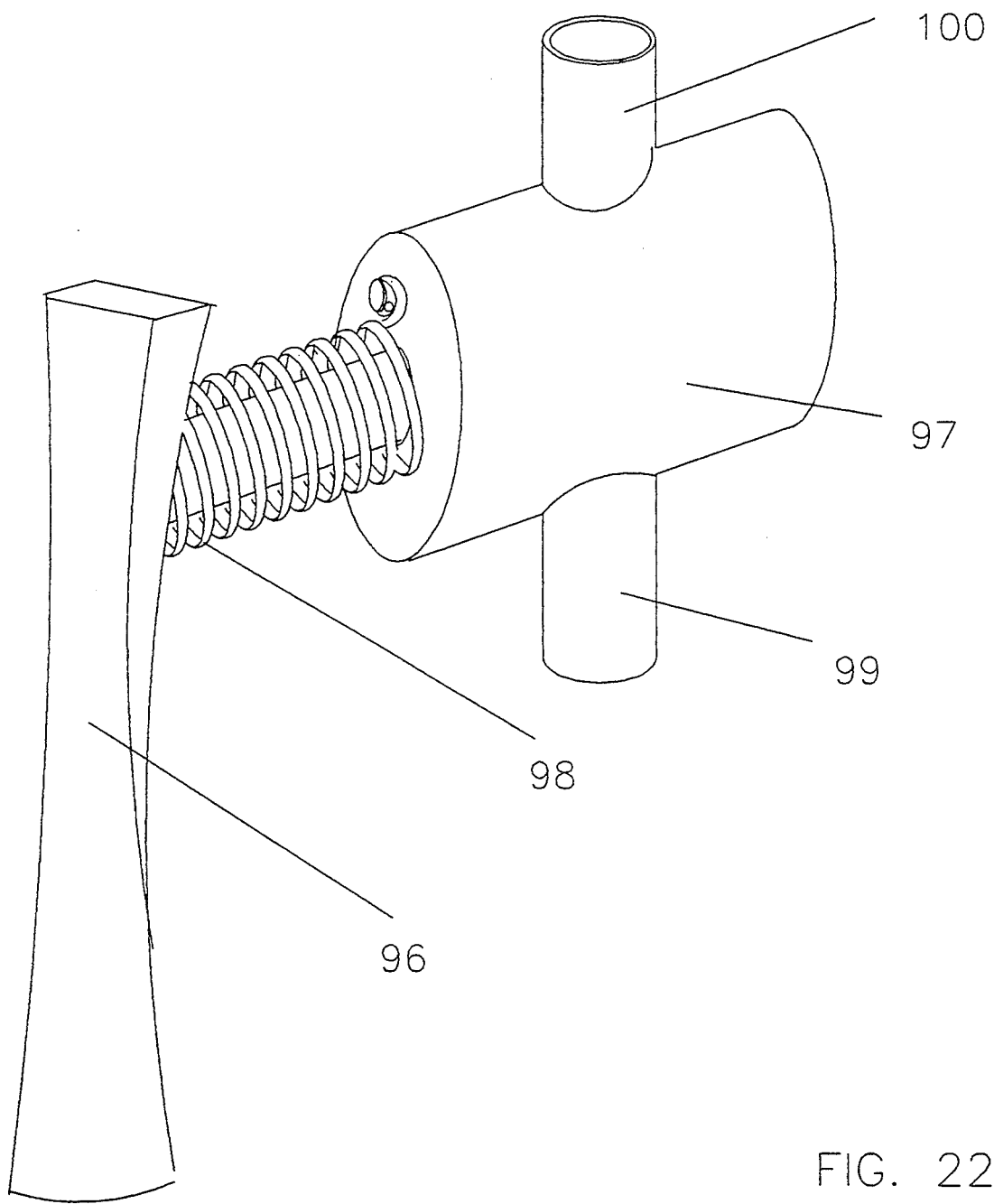
FIG. 22 is a perspective view of a wind operated air bleed valve.

A bleed valve could be controlled by other speed-related means, including a wind vane as shown in FIG. 22, where a vane 96, located in the air stream forward of the forks or fairing, is attached to a rotary air bleed valve 97 which can be mounted to the forks or fainting. A spring 98 exerts a force tending to keep the valve closed. An outlet tube 99 is connected to tube 86; an inlet tube 100 is connected to an air filter (not shown). Air moving past vane 96 rotates a valve core (not shown) against the torque of spring 98 to a degree roughly corresponding to vehicle speed, allowing filtered air from inlet tube 100 to enter outlet tube 99, thus increasing air pressure in tube 86 as described above.

Description/Operation of Long Link and Watts Linkage Embodiments

Figure 23:
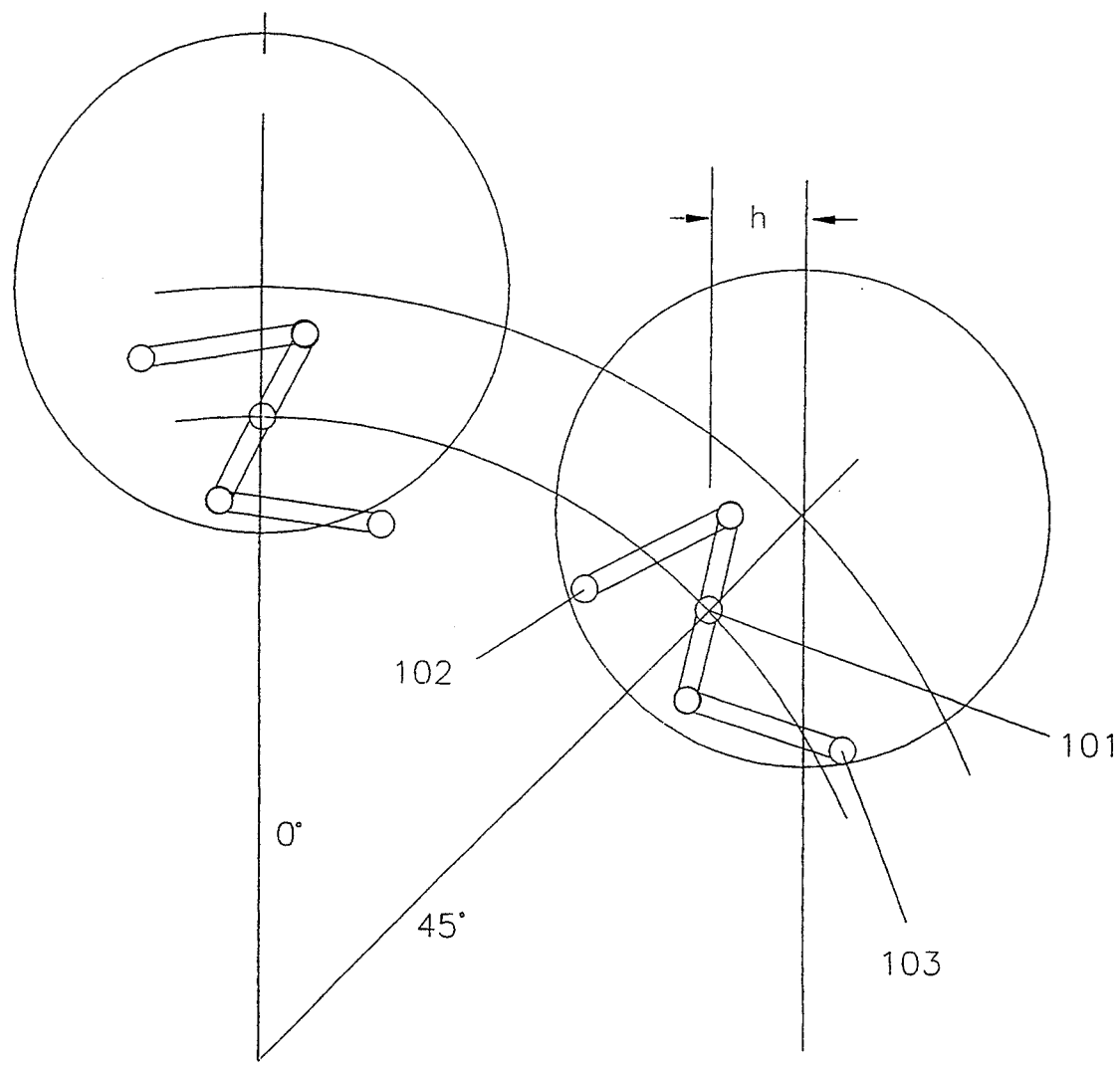
FIG. 23 is a schematic view showing key elements of a Watts linkage embodiment of the Motorcycle Headlight Aiming Device at two angles of bank.

In all embodiments using a pin engaged in a straight slot to limit or control the movement of the headlight assembly, the slot and pin may be replaced with a Watts Linkage, as shown in FIG. 23, where rear headlight assembly upper ball-joint 102 and rear headlight assembly lower ball-joint 103 are mounted to the rear of the headlight assembly. The center ball-joint ball, or bearing-point, 101 is attached to outer shell 37 in FIG. 12 where bearing-point, or pin, 45 is located. All bearings of the Watts Linkage are ball-joints in order to accommodate limited movement in a direction normal to the plane of the Watts linkage necessitated by the pivoting action of the headlight assembly.

FIG. 23 shows the movement h of the rear of the headlight assembly at two angles of bank, 0 and 45 degrees, whereby the straight-line motion of pin 45 relative to slot 40, as illustrated in FIG. 12, is replicated at ball-joint 101. This pivot-point may be movable, as is the pin described in the various movable-pin embodiments above.

A simple link, or movable arm, describes an arc when pivoted about one end. As the link radius is lengthened, the arc approaches a straight line; thus a long ball-jointed link may substitute for a straight slot and pin in some applications requiring motion in an approximate straight line. In the ball-jointed embodiment shown in FIGS. 17 and 18, horizontal slot 70 and fixed pin 72 may be replaced with a straight link attached to the top rear of the headlight assembly by a ball-joint, and to frame 64 where fixed pin 72 is located, by another ball-joint. This substitution would have the same effect on headlight assembly movement as if slot 70 were shaped like an arc from the bottom of a circle, and would result in raising the headlight beam with increased angles of bank, a result which would help correct for headlight height error.

Note that in all embodiments of the Motorcycle Headlight Aiming Device described above, the axis of headlight rotation is angled slightly downward toward the road in a forward direction with the motorcycle in an upright position. As the motorcycle is banked, the angle of the beam axis as viewed from the side becomes more horizontal, serving to raise the beam angle slightly to compensate for headlight height error.

Figure 24:
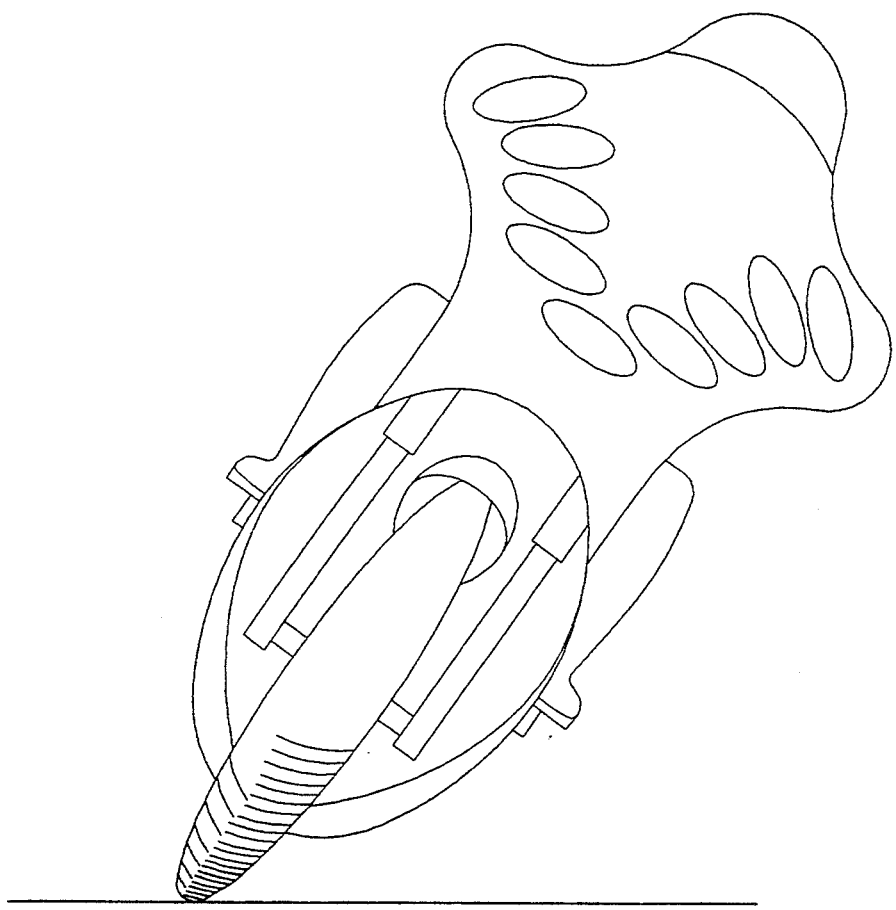
FIG. 24 is a head-on perspective view of a faired motorcycle, showing an embodiment of the Motorcycle Headlight Aiming Device which incorporates an array of fixed headlamps.

FIG. 24—Description/Operation of Motorcycle Headlight Aiming Device with Multiple, Fixed Lamps FIG. 24 shows a multi-headlight configuration, where one or more lamps of an array of lamps mounted to the fairing are each preset to the aim and beam pattern rotation appropriate to various degrees and angles of bank. As in previously described embodiments, bank sensor data, used alone or in combination with speed and possibly acceleration data, is used to control the headlight beam; in this case by switching on one or more lamps whose aim and beam rotation angle best illuminates the road ahead.

In order to reduce headlight height error, the lit headlights would be the highest ones, i.e. those mounted to the side of the vehicle facing the outside of the turn, which lift as the vehicle banks. A multi-headlight configuration has the advantage of no moving parts, except for the switch itself.

RELATED EMBODIMENTS

The microprocessor circuit is connected to a turn signal switch. Each time the motorcycle returns from a banked to an upright position, the turn signal, if on, will be turned off.

The microprocessor can also be connected to the engine ignition or intake system. Whenever the angle of bank exceeds a safe limit, the microprocessor will limit engine output and/or activate a warning signal. If the distance to the road, measured by forward-mounted sensors, exceeds the limit of front suspension travel, indicating front wheel lift-off, engine power is again reduced.

All embodiments are equipped with means to disable headlight movement of the Motorcycle Headlight Aiming Device in order to prevent unnecessary wear during daylight hours.

CONCLUSION, RAMIFICATIONS, AND SCOPE OF THE MOTORCYCLE

It should be emphasized that the Motorcycle Headlight Aiming Device constitutes an important advance in safety. Although the glare of a standard motorcycle headlight can seriously impair the vision of oncoming drivers in the outside lane of a turn, inadequate illumination of the road ahead, especially on curves, is even more dangerous. Unlit potholes, rocks, gravel, sand, water, wet leaves, ice, and debris can prove fatal to the motorcyclist. The fact that none of the prior art solutions to the inherent inadequacy of motorcycle headlighting are in use today is testimony to their unworkability, or to their prohibitive cost, rather than to a lack of necessity.

The Motorcycle Headlight Aiming Device described herein contains many specific embodiments and specific mechanical means; these should not be construed as limitations on the scope of the invention, rather as exemplifications of embodiments serving to clarify the underlying concepts.

Many other variations are possible, beginning with an embodiment which rotates the headlight beam about a longitudinal, or beam, axis only, and thus requires no pivots. Although this embodiment is claimed in claim 8, it is deemed simple enough not to require an illustration.

In the ball-jointed embodiments detailed in the Description/Operation section above, the headlight assembly may be rotated by a toothed belt system, or, alternatively, by a ball-jointed link connecting a motor-driven actuating arm with a horizontal arm of the headlight assembly. Both of these transmission systems are inexpensive, yet permit movement of the headlight assembly about two axes.

The circumferential ball-bearing of the first embodiment may be replaced by three or more small wheels, or rollers, attached to the inner or outer shell by axles, or by three or more planet gears as in a planetary transmission. The roller track, or the sun and planet gears, may be shaped to act as cams, thereby pivoting the headlight beam with headlight rotation without the use of pivots and without the use of mechanical means at the rear of the headlight assembly.

The cylinder and piston shown in FIGS. 20 and 20a may be replaced with a diaphragm, or with a flexible container of variable volume, e.g. an accordion-pleated cylindrical bellows.

A further variation may involve the use of a lens or lens lamination whose crystal structure, when voltage is applied, rotates the optical axis, and thus the headlight beam, as needed. Thus new materials and technologies may be incorporated into the basic principle of the Motorcycle Headlight Aiming Device.

Furthermore, the electronic and mechanical elements herein described could also be used to aim a camera mounted to a banking vehicle, either aimed forward in order to transmit or record an image of the road ahead, or aimed backward, possibly as an aid to rearward vision.

Accordingly, the scope of the invention should be determined not by its title, nor by the embodiments illustrated, but by the appended claims and their legal equivalents.

Although this patent may seem to encompass more than one invention, in fact, all the variations described herein embody a central, underlying concept, namely, a means for determining the bank, tilt, or attitude of a vehicle relative to the road surface by means of distance sensors, and correcting various conditions which arise from, or are related to, vehicle attitude. Thus all functions and ramifications of the Motorcycle Headlight Aiming Device flow logically from the consequences of vehicle attitude.

What is claimed is:

1. In a device for adjusting the headlight beam of motorcycles or other banking vehicles comprising radiant energy emittors and sensors located at predetermined points on said vehicle, and means for adjusting said headlight beam as a function of said sensor output, the improvement comprises:
   (a) distance-measuring means, or distance sensors, located substantially symmetrically on each side of said vehicle to a sprung component of said vehicle so that said vehicle's suspension is interposed between said distance sensors and the wheels, whereby said distance sensors are better protected from shock and weather;
   (b) electronic means whereby the angle and direction of bank of said vehicle are derived from a comparison of the measurement values from said distance sensors;
   (c) electro-mechanical means for rotating said headlight beam about a fore-aft, or beam, axis in response to said electronic means so that the approximately rectangular headlight beam cross-section remains substantially parallel to the road surface at any angle of bank, whereby curving roads are better illuminated.

2. The device of claim 1 further including mechanical means for pivoting said headlight beam about an axis perpendicular, or normal, to the road surface.

3. The device of claim 2 further including control means whereby the degree to which said headlight means is pivoted about an axis normal to the road surface at any given angle of bank is an inverse function of vehicle speed.

4. The device of claim 3 wherein the degree to which said headlight beam pivots about an axis normal to the road surface at any given angle of bank is determined by a speed-related input.

5. The device of claim 2 wherein the rotation of said headlight beam comprises a headlight assembly containing one or more headlamps about an optical, or beam, axis causes said headlight assembly to pivot about an axis normal to the road surface by mechanical linkage means.

6. The device of claim 5 further including means whereby the degree of said pivoting movement of said headlight assembly is further controlled by the position of a movable pin, or pivot point.

7. The device of claim 6 wherein said movable pin, or pivot point, may be positioned as a function of vehicle speed in order to optimize lighting in turns at any speed.

* * * * *